(12) United States Patent
Lyons

(10) Patent No.: US 6,742,539 B2
(45) Date of Patent: Jun. 1, 2004

(54) CO-AXIAL CONTROL VALVE

(75) Inventor: Jerry L. Lyons, Fort Wayne, IN (US)

(73) Assignee: Innovative Controls

( * ) Notice: Subject to any disclaimer, the term of this patent is extended or adjusted under 35 U.S.C. 154(b) by 0 days.

(21) Appl. No.: 09/865,174

(22) Filed: May 24, 2001

(65) Prior Publication Data

US 2002/0005217 A1 Jan. 17, 2002

Related U.S. Application Data

(60) Provisional application No. 60/206,889, filed on May 24, 2000.

(51) Int. Cl.⁷ .......................... F16K 1/12; F16K 31/124
(52) U.S. Cl. ....................................... 137/219; 137/220
(58) Field of Search .................................. 137/219, 220

(56) References Cited

U.S. PATENT DOCUMENTS

| | | | |
|---|---|---|---|
| 2,724,405 A | | 11/1955 | Stover |
| 2,919,714 A | | 1/1960 | Mrazek |
| 2,925,984 A | * | 2/1960 | Kowalski ................. 251/30.02 |
| 2,943,636 A | | 7/1960 | Reed et al. |
| 3,076,471 A | * | 2/1963 | Salerno ...................... 137/219 |
| 3,156,253 A | | 11/1964 | Marderness |
| 3,286,725 A | | 11/1966 | Elbogen et al. |
| 3,297,047 A | | 1/1967 | Sime |
| 3,399,689 A | | 9/1968 | Keane |
| 3,515,165 A | | 6/1970 | Zaboo |
| 3,734,120 A | | 5/1973 | Rowe et al. |
| 3,734,121 A | | 5/1973 | Rowe et al. |
| 3,850,196 A | | 11/1974 | Fales |
| 3,945,393 A | | 3/1976 | Teatini |
| 4,150,686 A | | 4/1979 | El Sherif et al. |
| 4,216,795 A | | 8/1980 | Cobb et al. |
| 4,619,288 A | | 10/1986 | McPherson |
| 4,681,130 A | | 7/1987 | Tabor |
| 4,777,979 A | | 10/1988 | Twerdochlib |
| 4,907,615 A | * | 3/1990 | Meyer et al. .......... 137/625.64 |
| 5,178,358 A | * | 1/1993 | Schwelm ...................... 251/29 |
| 5,251,148 A | * | 10/1993 | Haines et al. ............ 137/487.5 |
| 5,540,252 A | | 7/1996 | Bruun |
| 5,669,413 A | | 9/1997 | Hegglin et al. |

OTHER PUBLICATIONS

PennWell, Oil, Inc. Gas Petrochem Equipment, Jun. 1998, vol. 44, No. 8, p. 1.

* cited by examiner

Primary Examiner—Gerald A. Michalsky
(74) Attorney, Agent, or Firm—Peter S. Gilster; Greensfelder, Hemker & Gale, P.C.

(57) ABSTRACT

A flow control valve has a housing having a fluid inlet at one fitting end and fluid outlet at another fitting end, and a control body supported within the housing by support structure bridging between the control body and the housing such that for flow of fluid through the valve from the inlet to the outlet is along fluid paths symmetric with respect to an axis of the control body, the control body and support structure being streamlined so as not to interfere substantially with flow. At least one valve member is carried by the control body in an orientation for being shifted by driven movement along the axis relatively toward and away from the fitting end for control of fluid passing through the fitting end in response to an actuator within the control body. At least one port extends through the support structure for communicating with the actuator and providing for control of the actuator.

29 Claims, 16 Drawing Sheets

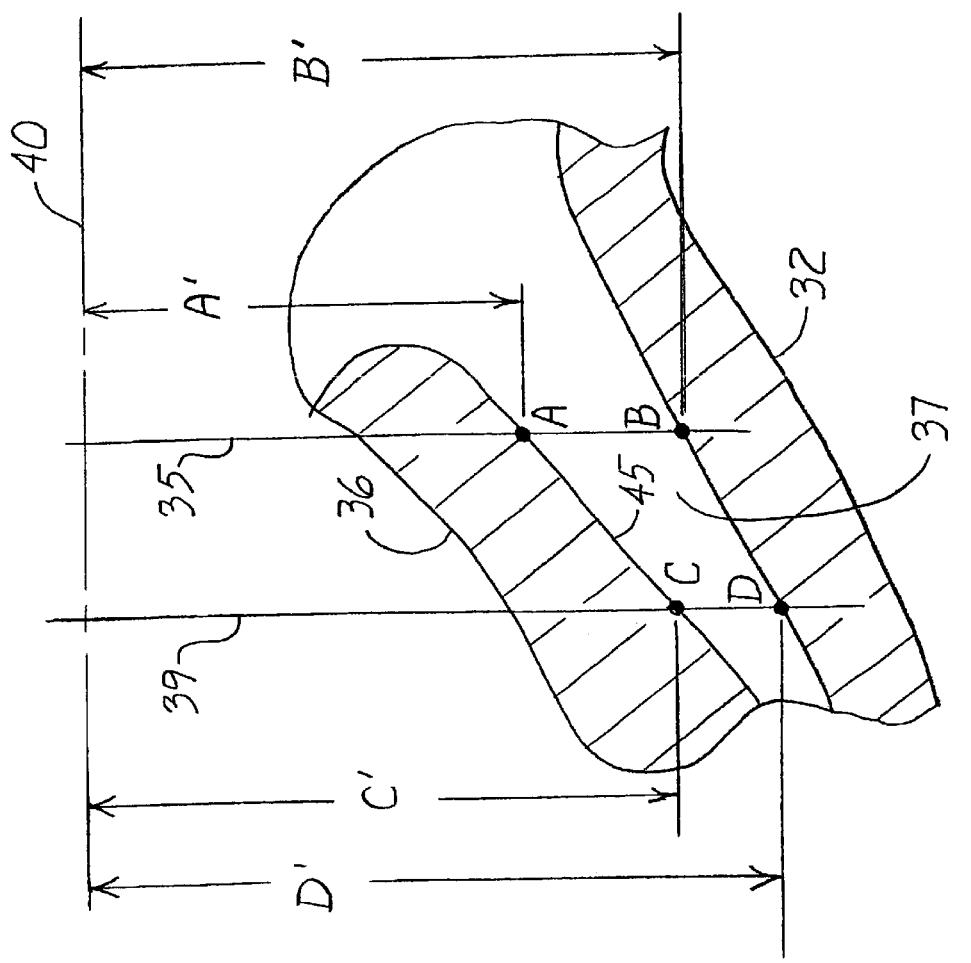

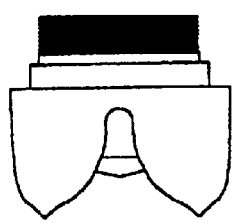
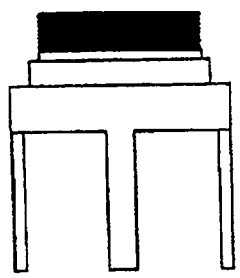
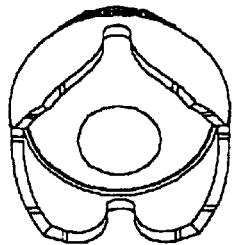
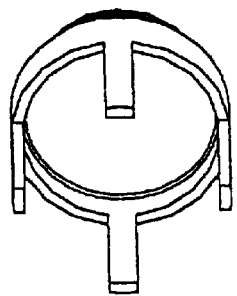
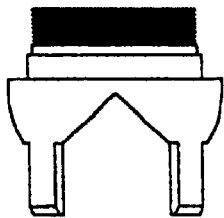
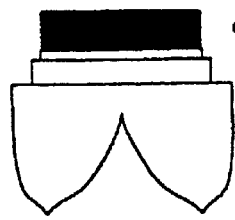
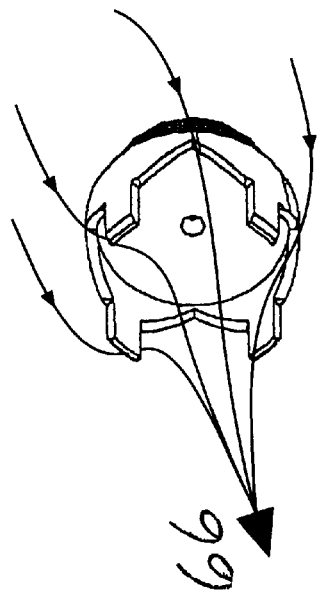
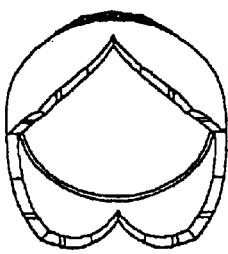

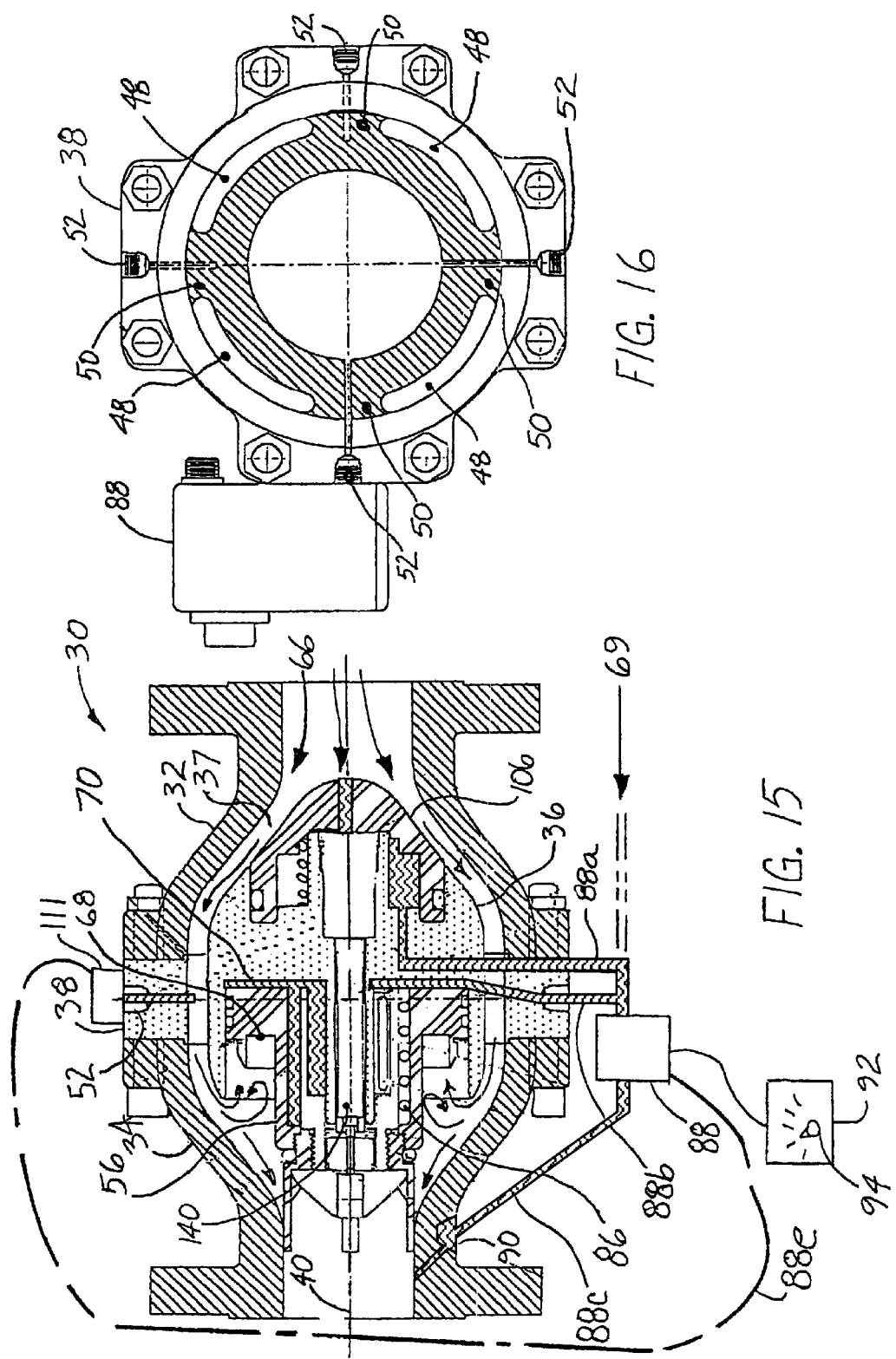

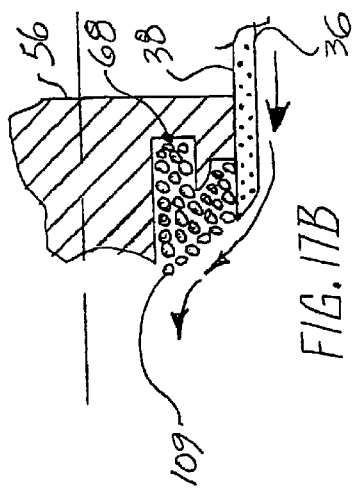
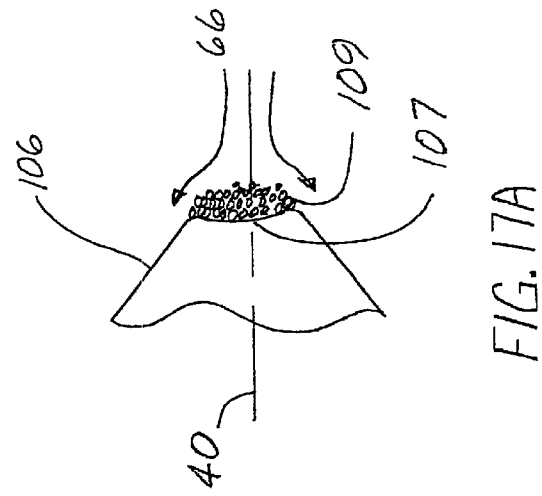
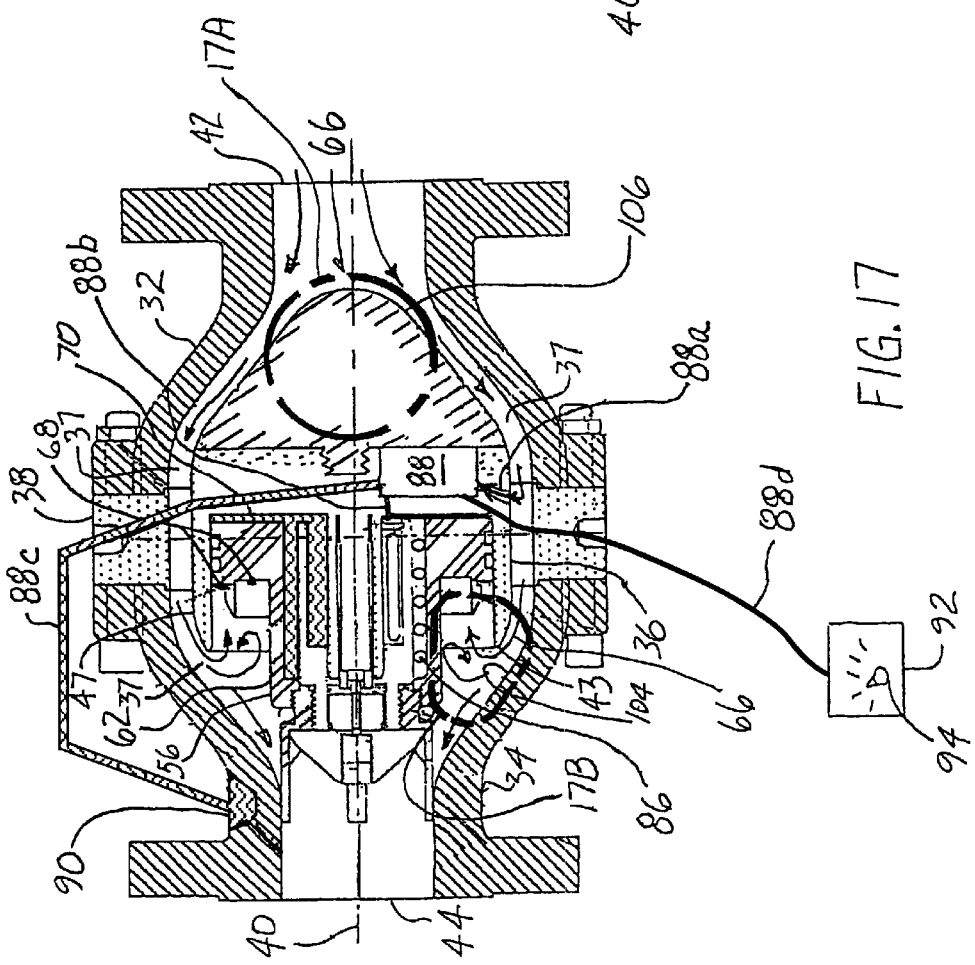

CO-AXIAL CONTROL VALVE

CROSS-REFERENCE TO RELATED APPLICATIONS

This application is based upon Provisional Patent Application Ser. No. 60/206,889, entitled "Co-axial Control Valve", filed May 24, 2000, the contents of which are incorporated herein by reference in their entirety and continued preservation of which is requested.

BACKGROUND OF THE INVENTION

This invention relates to control valves and, more particularly, to a new and highly advantageous precision control valve for providing precise, selective control of fluid flow through the valve, while additionally providing greatly improved response, significantly increased fluid flow rates, and dramatically reduced overall size and weight.

Instrumented control valves, also called final control elements, regulate the flow or pressure of a fluid which affects many controlled process. Control valves are usually operated by remote signals from independent devices using control mechanisms, and may be powered electrically, pneumatically, electro-hydraulically, etc. Control valves are extensively used in many industries, including chemical, petrochemical, oil, water, and gas. Many companies in all industries are having major problems in the areas of energy consumption and wasted product, due to the complexities of their process control systems.

Industry research has revealed that of all the components and instrumentation used in process control systems, it is the control valve that has resulted in a major portion of energy consumed. Moreover, the slow or erratic response of conventional control valves are directly responsible for most of the wasted product. This is reflected in the responses from systems engineers that most plants cannot process a consistent quality product, without them having to constantly adjust the system. The unfortunate result is that after spending a great deal of time setting up a controlled process, the systems engineer out of frustration, may adjust the valve to a compromised setting or operate it manually, resulting in millions of dollars of low quality or wasted product.

The mechanics of control valve design have not changed much over the years. New electronic devices controlled by computers have generally been unable to improve response times of control valves to stabilize controlled systems. Although valves with rapid response times have been used in the aerospace industry, i.e., to shuttle fluids between the wings, they are incapable of regulating, and are used only for on/off or as relief valves. Often the electronic accessories have only made the process system control worse because of their high speed feedback. Such rapid feedback is normally desirable. Constraints in existing control valves cause them to be much too slow to react to the rapid process signal. Moreover, in this situation, the control valve continues to receive additional signals before it can respond to the initial signal, causing the control valve to become erratic and unstable.

A conventional control valve, is typically a globe valve due to its ability to more precisely control flow, uses a totally external driving means, also referred to as control components, to actuate the valve member that is exposed to and effects control of the fluid in the pipeline. This external driving means generally consists of a cumbersome, elongated structure usually much larger than the valve itself, containing a linkage to the control member that is in communication with the fluid in the pipeline, also referred to as the working fluid. This linkage generally includes a shaft and a spring for urging the valve member toward a valve opening position. A large diaphragm, generally located at the top of the elongated structure and supplied by an external pneumatic source, urges the linkage toward a closed position. The design of this external driving means has remained basically unchanged for many years. A conventional control valve generally works as follows: after receiving a signal indicating that the control member needs to actuate to a different position, the pneumatic source adjusts the pressure in a chamber above the diaphragm. The speed of pneumatic line flow to effect this change is limited to the speed of sound. Additionally, the force generated by the diaphragm to effect this change in position of the valve member must first overcome the resisting forces acting on the valve member by the fluid in the pipeline, the inertia in the linkage itself (including, but not limited to the shaft and friction associated with O-rings and packings installed to prevent valve leakage; the term "striction" has been coined and used by those skilled in the art to refer to any type of mechanical valve restriction), and the spring force (if the valve member is to be moved toward a valve closing position).

Moreover, after sufficient pressure is built up in the chamber above the diaphragm to effect valve member movement, unless the target position is to completely open or to completely close the valve, the linkage inevitably drives the valve member past the target position, commonly referred to as overshoot or gain. The valve member must then be repositioned in the opposite direction, with the overshoot in this direction commonly referred to as droop. This combination of gain and droop is referred to as dead band, which may cause hysteresis. Hysteresis is the tendency of the valve to give a different output for a given input, depending on whether the input resulted from an increase or decrease from the previous value. Hysteresis is distinguished from dead band in that some reversal of output may be expected for any small reversal of input. To then correct gain or droop, the pressure above the diaphragm must again be adjusted, again with the same pneumatic line flow limitations, and again the inertia of the linkage must be overcome. Valve hysteresis must also be taken into consideration. Additionally, a change in pressure may affect the working fluid flow rate, especially if the fluid is a gas, due to compressibility, which is the fractional change in volume of a fluid per unit pressure change. To make matters worse, if the driving means is not mounted in a substantially vertical position, which generally requires that the control valve be installed in a horizontal position, unbalanced forces are introduced into the system due to side loads caused by gravity. These unbalanced forces produce additional friction forces, which further worsen an already excessive response time. Worse yet, even properly installed control valves may experience other adverse effects due to circumstances requiring component re-routing, e.g., clearance problems with an existing plumbing system. This may be due to the installation of geared linkages necessary to achieve the desired vertical position, which produces its own backlash.

A goal of system engineers is to design a control system so that when it is disturbed, the controlled process variable will come under control again as quickly as possible. The time required for a control system to regain control after it has been upset and temporarily goes off control is commonly referred to as recovery time. The time delay between two related events is commonly referred to as dead time. An example of dead time as it relates to the control valve is the delay encountered between the time the signal is sent to effect valve member movement, and the time actual valve member movement is effected. Generally, the recovery time of a control system will increase in direct proportion to the dead time. That is to say, if the dead time is doubled, the control system will take twice as long to stabilize, or regain control. Dead time is the antithesis of effective process control. A 7–8% dead time has been associated with a conventional control valve. A recently conducted study of an industrial control process using such a valve revealed that costs associated with waste could approach US$750,000 annually from just a 2-inch valve above. Moreover, based on flow area ($\pi r^2$), waste from an 8-inch valve could approach 16 times that of a 2-inch valve, or US$12,000,000 annually.

In addition to process control problems, both the valves, including the valve housing and control components, as well as downstream components are subjected to fluid flow pulsation surges. These pulsation surges, which invariably occur during any control process, create fluid stresses that act on the valves and downstream components, thereby significantly reducing their service life.

To summarize, conventional control valves are often too slow to respond to industry's process control needs, costing billions of dollars annually. There is an urgent need for an improved valve design capable of more rapid response. More specifically, a valve capable of effective integration with computerized control is highly desired.

There is also an urgent need for a valve design that weighs significantly less, reduces significantly the size and weight of control components external to the valve housing, handles significantly greater flow rates thereby reducing energy costs associated with control system operations, and is substantially more flexible in application, e.g., can be installed in any attitude, horizontal, vertical, sloped, etc., without degraded performance.

There is also a need for a valve design that dramatically increases the service life of the valve housing. More specifically, an improved valve design is needed that creates boundary layers in the fluid flow to help protect valve components, while simultaneously providing smoother, more uniform flow.

There is also a need for a valve housing design that is capable of absorbing fluid pulsation surges, to help effect more focused, uniform flow of the fluid through the pipeline, which greatly increases the life of downstream components, due to decreased fluid-induced stresses.

There is also a need for a valve design containing a minimum number of moving parts for additional reliability.

There is also a need for a valve having dramatically increased rangeability, which is defined as the ratio of maximum to minimum flow within which all flow characteristics are maintained within prescribed limits.

SUMMARY OF THE INVENTION

Accordingly, among the several objects, features and advantages of the invention may be noted the provision of a valve that uses the working fluid in the pipeline to both help balance and to actuate the valve control members. By helping balance the valve members, the size of the actuator required to effect controlled valve member movement is also greatly reduced. In an alternate embodiment, the valve can also use pressurized fluid from an external source to both help balance and to actuate valve members. The valve also has rapid response capabilities and can be configured for efficient computer control. The valve housing in its preferred form, an in-line co-axial configuration, yields significantly increased flow capacity over a globe valve of similar size, the generally utilized valve configuration for control valves.

A coaxial control valve of the present invention may have the flow rate of a ball valve, yet providing the degree of flow control associated with a globe valve. Moreover, the present valve enables the user to control flows down to extremely low levels, e.g., 1.0 cubic centimeter per minute, while reaching flow rates of more than 200 gallons per minute (for a 2-inch valve design of the present invention). This represents a rangeability (see previously provided definition) having an order of magnitude of $10^5$. Rangeability for conventional valves is normally less than 250.

The new coaxial control valves are extremely light and compact. A 2-inch valve of the present invention weighs approximately 35 pounds. Conventional control valves in industry generally weigh from 125 to 170 pounds.

Optionally, a 2-inch valve design of the present invention, by permitting flows of more than 200 gallons per minute, exceeds the flow rates permitted by conventional 2-inch globe valves by a factor of 5, based on flow coefficient values, denoted as $C_v$, and defined as the flow in gallons per minute of water at 60° F. with a pressure drop of one pound per square inch (psi). The $C_v$ value associated with a 2-inch valve of the present invention is more than 200, while the $C_v$ value associated with a 2-inch globe valve is 44.34. By comparison, the $C_v$ value for a 2-inch standard port ball valve is 120, which in its fully open position presents a totally unrestricted cross sectional area through the valve. By permitting dramatically increased flows while using the same amounts of energy, the valve of the present invention also substantially reduces energy costs.

Additionally, by reconfiguring valve components, boundary layers are created in the fluid flow to help protect valve components from frictional wear, while simultaneously providing smoother, more uniform flow.

Additionally, by incorporating pulsation dampening capabilities into the inner workings of the valve, pressure spikes are significantly reduced, thereby reducing fluid-induced stresses and significantly increasing the service life of downstream components. Therefore, although initially intended for use as a control valve, the valve of the present invention may also be configured for at least the following additional uses: shut-off valve, check valve, flow meter, safety valve, relief valve, safety relief valve, velocity control valve, pressure control valve, pulsation dampener and spike attenuator valve and temperature control valve. Other objects and features will be apparent or are pointed out more particularly hereinbelow.

Briefly, a flow control valve of the present invention comprises a housing having a fluid inlet at one fitting end and fluid outlet at another fitting end, and a control body supported within the housing by support structure bridging between the control body and the housing. The housing and control body together define a flow passage communicating with the fluid inlet and outlet for flow of fluid through the valve from the inlet to the outlet along fluid paths symmetric with respect to an axis of the control body. The control body and support structure are streamlined so as not to interfere substantially with the flow of fluid along the flow paths. At least one valve member is carried by the control body in an orientation for being shifted by driven movement along the axis relatively toward and away from the fitting end for control of fluid passing through the fitting end. An actuator within the control body drives the valve member along the axis, and at least one fluid port extends through the support structure for communicating with the actuator and provide for control of the actuator.

BRIEF DESCRIPTION OF THE DRAWINGS

FIG. 4A is a partial view taken from FIG. 4 of the flow passageway between the housing and control member to illustrate the "wedging effect";

FIG. 7 is a perspective view of a valve end fitting, or valving element, to be inserted at the end of an alternate valve configuration of FIG. 6;

FIG. 8 is a side elevation view of the valve end fitting of FIG. 7;

FIG. 9 is a perspective view of a valve end fitting, or valving element, to be inserted at the end of an alternate valve configuration of FIG. 6;

FIG. 10 is a side elevation view of the valve end fitting of FIG. 9;

FIG. 11 is a perspective view of a valve end fitting, or valving element, to be inserted at the end of an alternate valve configuration of FIG. 6;

FIG. 12 is a side elevation view of the valve end fitting of FIG. 11;

FIG. 13 is a perspective view of a valve end fitting, or valving element, to be inserted at the end of an alternate valve configuration of FIG. 6;

FIG. 14 is a side elevation view of the valve end fitting of FIG. 13;

FIG. 15 is a longitudinal cross section of an alternate valve component arrangement taken along line 4—4 of FIG. 2;

FIG. 16 is a transverse cross section of an alternate valve component arrangement taken along line 5—5 of FIG. 1;

FIG. 17 is a longitudinal cross section of an alternate valve component arrangement taken along line 4—4 of FIG. 2;

FIG. 17A is a partial view of an alternate configuration of a valve component taken from FIG. 17;

FIG. 17B is a partial view of an alternate configuration of a valve component taken from FIG. 17;

Corresponding characters indicate corresponding elements in different views of the drawings.

DESCRIPTION OF PRACTICAL EMBODIMENTS

Figure 1:
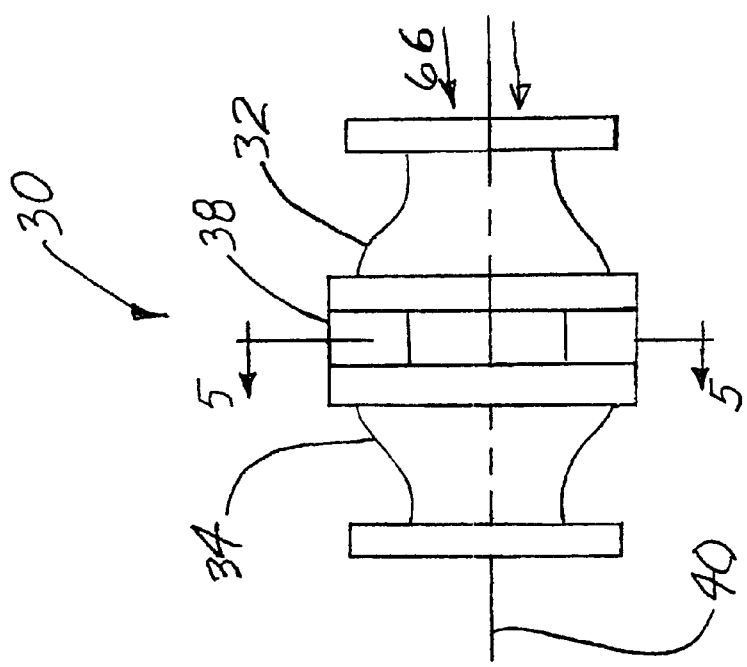
FIG. 1 is a side elevation view of a flow control valve housing in accordance with and embodying the present invention including a support structure of the valve.

Referring to the drawings, FIG. 1 illustrates a valve 30 of the present invention having an inlet housing half 32 at one fitting end and an outlet housing half 34 at the other fitting end, the volume enclosed within housing halves 32 and 34 collectively referred to as the housing. Referring to FIG. 4, a control body 36 is supported within the housing by support structure 38 disposed between housing halves 32 and 34, support structure 38 bridging between control body 36 and the housing. The housing and control body 36 together define a flow passage 37 communicating with inlet half 32 and outlet half 34 for flow of fluid through valve 30. Housing halves 32 and 34 are preferably interchangeable and symmetric about at least one axis perpendicular to a central axis 40 running longitudinally through the center of valve 30. In other words, the flow paths are preferably symmetric about at least one axis perpendicular to the direction of fluid flow. Also preferably, referring to FIGS. 1–3, valve 30 is of in-line construction. That is to say, centers 46 of inlet 42 of inlet housing half 32 and outlet 44 of outlet housing half 34 are coincident.

Although inlet housing half 32, outlet housing half 34 and support structure 38 are separately identified components, it is possible that support structure 38 and either housing half could be of integral construction. It can also be seen by one skilled in the art that housing halves 32 and 34 do not need to be interchangeable or symmetric about a single axis perpendicular to a central axis 40. Additionally, although the preferred and most efficient construction of valve 30 is in-line, it can be seen that any number of non-aligned valve constructions can also be used.

Figure 3:
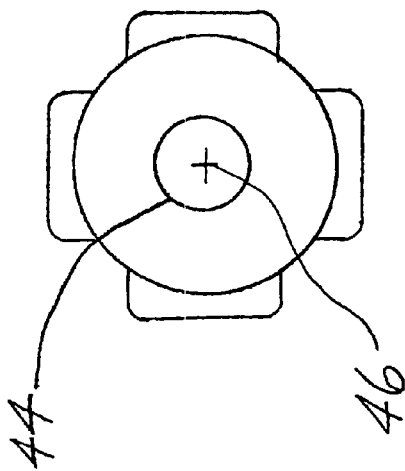
FIG. 3 is an end elevation view of an outlet of the valve.
Figure 4:
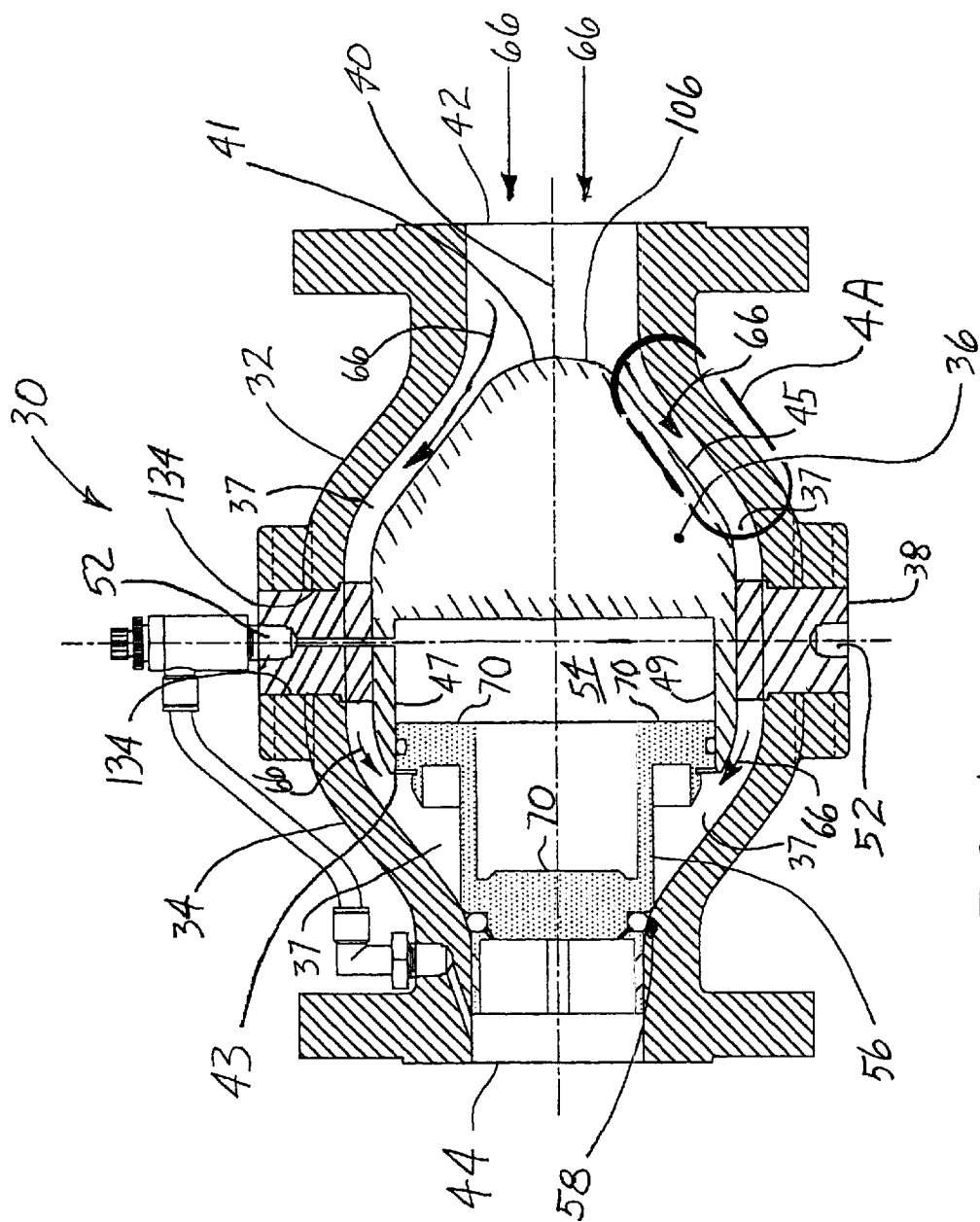
FIG. 4 is a longitudinal cross section of the valve taken along line 4—4 of FIG. 2.
Figure 5:
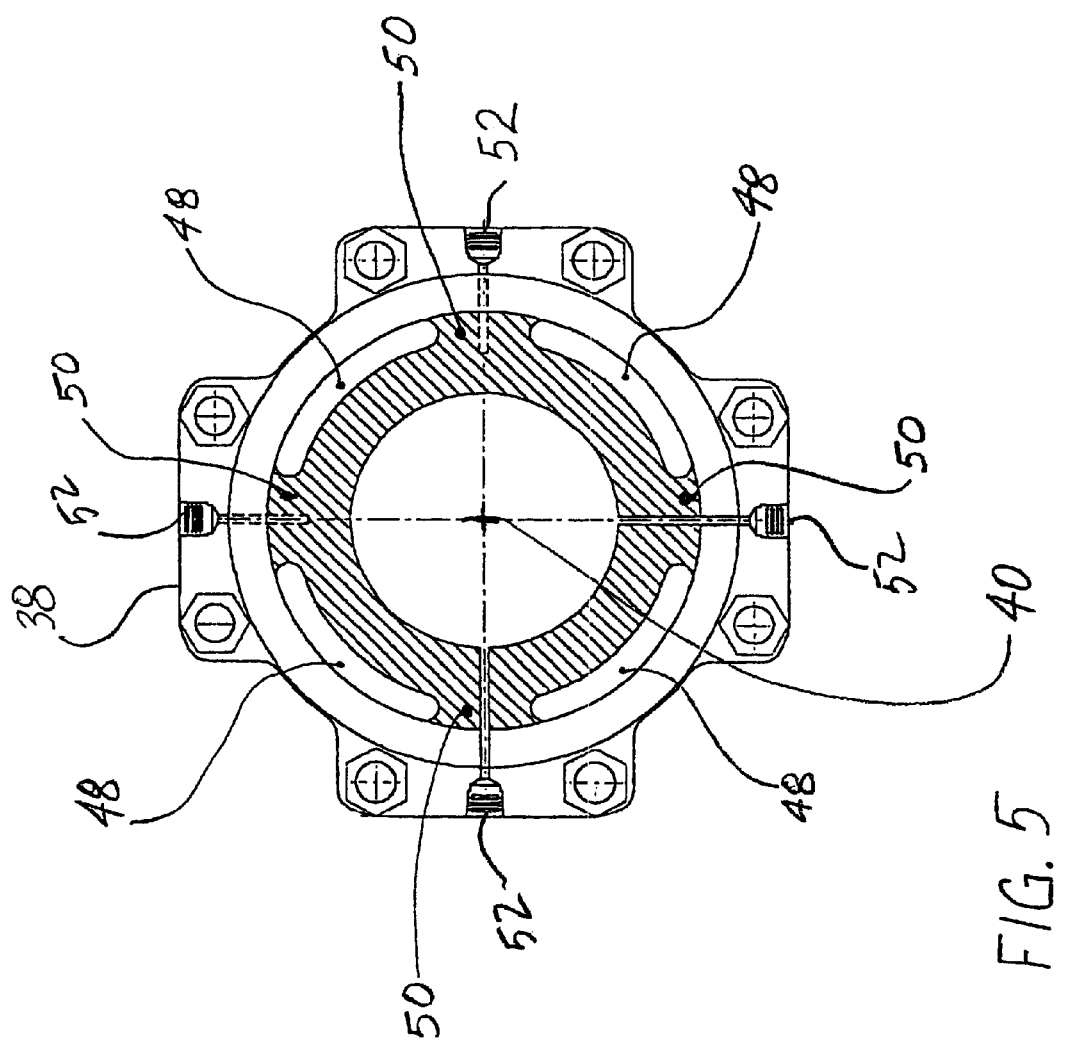
FIG. 5 is a transverse cross section of the valve taken along line 5—5 of FIG. 1.

Referring to FIGS. 1–5, support structure 38 has at least one passage 48 formed therein to provide relatively uninterrupted fluid flow between inlet 42 and outlet 44. Preferably, support structure 38 has at least one, four as illustrated in FIG. 5, co-axially symmetric passages 48 formed with respect to central axis 40 running longitudinally through the center of valve 30, also having in this instance four control body support members 50, which are configured to provide relatively uninterrupted fluid flow between inlet 42 of inlet housing half 32 and outlet 44 of outlet housing half 34. Referring to FIG. 4, support structure 38 has at least one port 52 extending therethrough, preferably radially outwardly extending, for communicating with actuator 54 within control body 36 for driving valve member 56 along an axis in control body 36, preferably central axis 40, relatively toward or away from a valve seat 58 for control of fluid passing valve seat 58.

Referring to FIG. 4, The preferred embodiment of valve 30 is an in-line, co-axial valve, as reflected in its most efficient configuration, with all valve components internal of the housing symmetric about central axis 40 running longitudinally through the center of the valve 30. It can be seen by one skilled in the art that any number of variations of nonaligned, non-symmetric valve configurations that may be required due to spatial constraints in application, could also successfully function. One such example is a flow passage being symmetric about at least one axis perpendicular to the direction of flow, as in a sandwich valve. It can be seen that actuator 54 may be a motor powered by any multitude of sources including electrical, pneumatic, electro-hydraulically, etc., and that in its most basic form, actuator 54 can be a chamber into which is introduced fluid to effect movement of valve member 56.

Referring to FIG. 4, support structure 38 includes control body 36 which extends in both directions, preferably along central axis 40, for directing working fluid 66 therearound. Extending from support structure 38 in a direction toward inlet 42, control body 36 defines a preferably circular conical portion 45 terminating in a rounded leading end 41. Similarly, extending from support structure 38 in a direction toward outlet 44 is a second portion 47. Formed in second portion 47 to a depth sufficient to carry valve member 56, preferably along central axis 40, is a bore 49. Thus second portion 47, which would otherwise define a mirror image of conical portion 45 before the introduction of bore 49 therein, terminates at rearward end 43.

Figure 2:
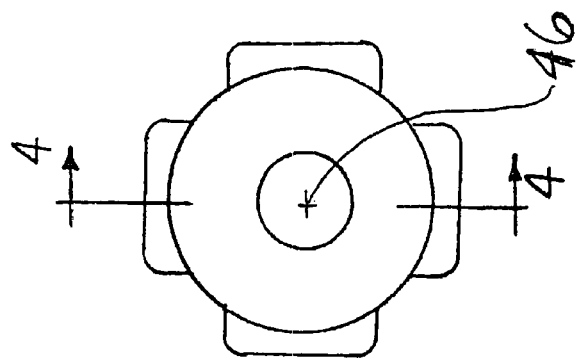
FIG. 2 is an end elevation view of an inlet of the valve.

Referring to FIGS. 2–3, the cross sectional areas at inlet 42 and outlet 44 are preferably equal, and for purposes herein, can be designated as $A_i$ and $A_o$, respectively. Referring to FIG. 5, the cross sectional area along support structure 50 through which working fluid 66 must pass may be represented by support structure passages 48. It is recognized that any number of passages may be formed through support structure 38 to produce a preferably symmetric flow path about central axis 40. The cumulative flow path cross sectional area of support structure passages 48 formed in support structure 38, which is calculated by adding the cross sectional areas of the four support structure passages 48, is generally between 10–20 percent larger than $A_i$ or $A_o$.

The cross sectional area of the flow path defined by the valve housing and control body 36 will now be discussed. Referring to FIG. 4, fluid 66 enters inlet 42 and upon encountering leading end 41 of control body 36, is bent or "wedged" therearound, following a flow passage 37 defined by conical portion 45 and inlet housing half 32. At the point where fluid 66 first encounters leading end 41, the cross sectional area is generally between 1.1 *$A_i$ and 1.2*$A_i$. This cross section area is maintained as fluid 66 proceeds in a direction along flow passage 37 toward support structure 38. By increasing the cross sectional area generally between 10–20 percent along flow passage 37 from that of $A_i$ and $A_o$, the loss of fluid energy due to friction associated with directing the flow of fluid 66 along flow passage 37 which steeply diverges from central axis 40, also referred to as "up the ramp," is minimized. Once fluid 66 reaches support structure 38, it is directed through passages 48, which also has the same cross sectional area which is generally between 1.1 *$A_i$ and 1.2* $A_i$. After passing through passages 48, fluid 66 continues to proceed in a direction along flow passage 37 toward outlet 44. Outlet 44 has a cross sectional area $A_o$.

Once fluid 66 has passed through passages 48, fluid 66 enters the remaining portion of flow passage 37 which is radially defined by second portion 47, valve member 56 and outlet housing half 34. There is symmetry about central axis 40 between inlet housing half 32 and outlet housing half 34 and between conical portion 45 and second portion 47. Due to this symmetry, the cross sectional area of flow passage 37 from core facing flange surface 134 of housing half 34 to end 43 of second portion 47 is the same as from core facing flange surface 134 of housing half 32 to a corresponding position on conical portion 45. That is, the cross sectional area of flow passage 37 is also generally between 1.1 *$A_o$ and 1.2*$A_o$ at surface 134 of housing half 34. This cross sectional area along flow passage 37 is maintained through end 43 of second portion 47. Fluid 66 is subjected to a "wedge effect" as it flows along flow passage 37, especially from leading end 41 to the mid portion of passage 48. This "wedge effect" directs and maintains fluid 66 in a focused stream around control body 36, thereby improving flow characteristics.

Although the cross sectional area along flow passage 37 is constant as the fluid passes from leading end 41 to rearward end 43, fluid 66 is subjected to a "wedge effect" as it passes from leading end 41 through the mid portion of passages 48. Upon passing the mid portion of passage 48, fluid 66 is subjected to an extremely minimized reverse "wedge effect." Referring to FIGS. 4 and 4A, the wedge effect is exaggeratedly illustrated for clarity. Line 35 represents a plane which is perpendicular to central axis 40 that cuts through points A and B residing on the surface of conical portion 45 and the surface of housing half 32, respectively. Further, dimensions A' and B' represent the radial distance from central axis 40 to points A and B, respectively. The intersection of this plane, these surfaces and points A and B define an annular region symmetric about central axis 40 having an inside radius A' and an outside radius B'. Similarly, line 39 represents a plane perpendicular to central axis 40 that cuts through points C and D residing on the surface of conical portion 45 and the surface of housing half 32, respectively. Dimensions C' and D' represents the radial distance from central axis 40 to points C and D, respectively. Likewise, the intersection of this plane, these surfaces and points C and D define an annular region symmetric about central axis 40 having an inside radius C' and an outside radius D'.

The area of the annular region defined by line 35 through points A and B is: $\Pi(B^2-A^2)$.

The area of the annular region defined by line 39 through points C and D is: $\Pi(D^2-C^2)$.

As discussed previously, the cross section values are equal to each other, so after dividing both sides by $\Pi$, yields the following relationship $(D^2-C^2)=(B^2-A^2)$.

It can be shown that if the radial distance from central axis 40 to point D is greater than the radial distance to point B, the distance between points C and D, which is equal to D'-C', is less than the distance between points A and B, which is equal to B'-A'. Therefore, as fluid 66 proceeds along flow passage 37 between leading end 41 to the mid portion of passage 48, flow passage 37 incrementally narrows. This narrowing of the thickness of flow passage 37 helps minimize the amount of fluid flow loss due to friction. It is noted that the effects of "reverse wedging," which is subjected to fluid 66 passing along flow passage 37 from the mid portion of passage 48 to rearward end 43 is minimal. Any "reverse wedging" effect is minimal because the direction of fluid flow in this region of the valve is predominantly parallel to central axis 40, thus there is minimal widening of flow passage 37.

Further, the relative uniformity in cross sectional area throughout the length of the valve, and especially so over the length of control body 36, decreases the susceptibility of working fluid 66 to cavitation, which is defined as a localized gaseous condition in a liquid stream caused by sudden expansion or any other condition in which pressure falls below the critical pressure. The critical pressure is the ratio of downstream to upstream pressure at the point of sonic flow for gases. The excessive formation of cavitation bubbles in valves and downstream of the valves acts to greatly reduce fluid flow rate.

Figure 6:
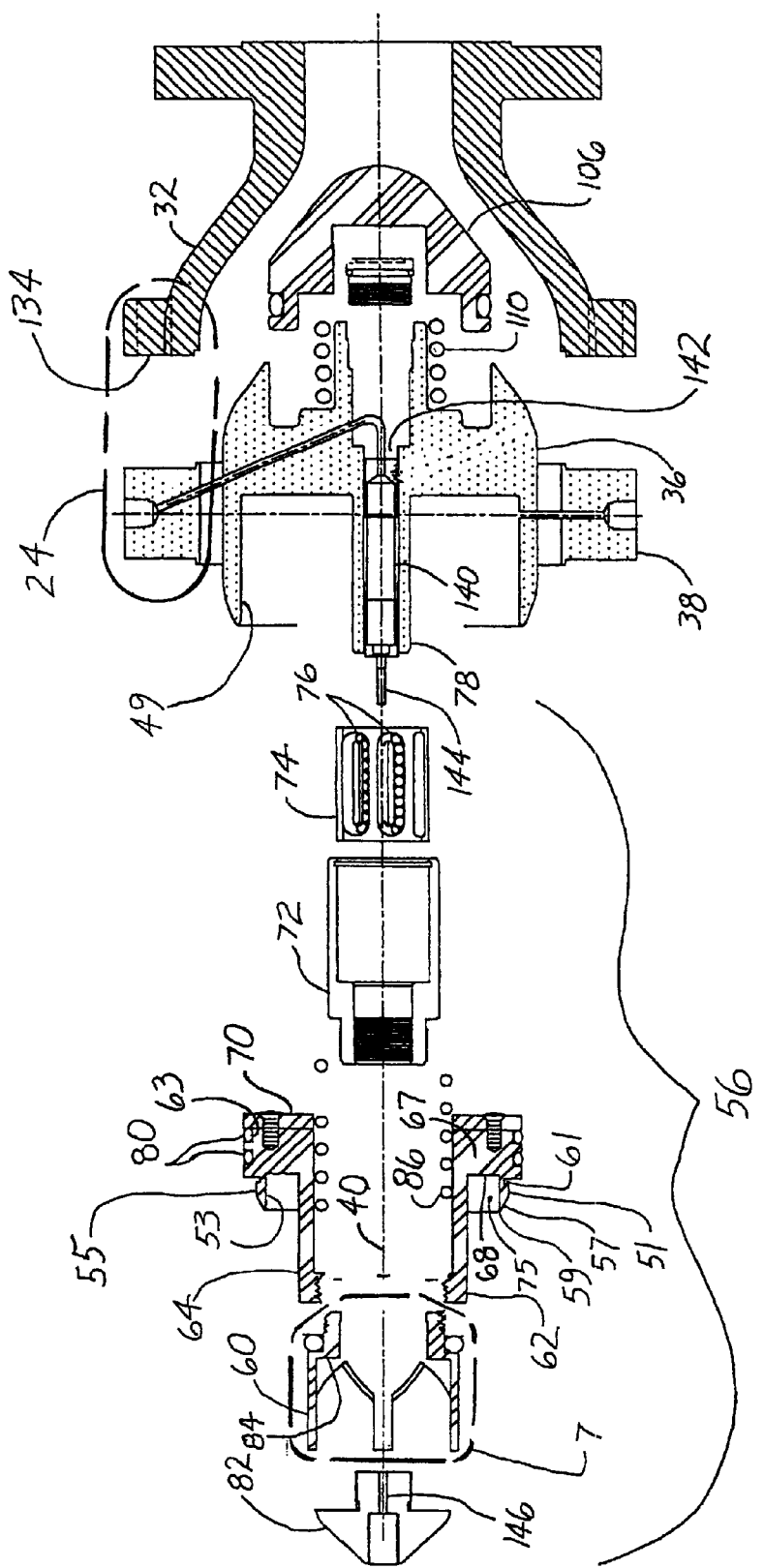
FIG. 6 is an exploded longitudinal cross section of an alternate valve component arrangement taken along line 4—4 of FIG. 2.

FIG. 4 illustrates a valve member 56 disposed between control body 36 and one housing end, preferably outlet housing half 34. Valve member 56 is carried by control body 36 for being shifted by driven movement along an axis in control body 36 relatively toward and away from valve seat 58. Referring to FIG. 6, valve member 56 is first comprised of a valving element 60, also referred to as a poppet. Valving element 60 is preferably connected so that a plurality of interchangeable contoured valving elements permitting differing flow behavior, as illustrated in FIGS. 7–14 but not limited to those contours, also referred to as profiles, may be installed.

FIGS. 7–14 represent four commonly used valving element contours. These four contours in particular are associated with symmetrical and uniform distribution of fluid flow resulting in homogenation of the fluids as it exits the valve, especially when used with the valve of the present invention. These contours act to enhance the symmetrical and uniform distribution of fluid flow characteristics that the valve imposes on the fluid as the fluid passes through the valve. The linear valving contours are identified as follows: FIGS. 7–8 illustrate a linear contour, FIGS. 9–10 illustrate an equal percentage contour, FIGS. 11–12 illustrate a parabolic or modified parabolic contour, and FIGS. 13–14 illustrate a quick opening contour. As illustrated in FIG. 7, fluid 66 flows past the valving element in four evenly distributed, focused streams. These four focused streams converge in the middle of the pipeline some distance downstream of the valve outlet. This produces numerous beneficial results due to improved flow characteristics. By converging the streams in the middle of the pipeline, fluid-induced wear to downstream plumbing and downstream components is minimized. Additionally, because the focused streams also reconverge in a focused manner, minimum air bubbles and undue turbulence are produced, thereby permitting greatly increased flow rates. Moreover, such reconverging flow results in more thorough mixing of fluid 66. This is especially beneficial in that most controlled processes involve combining different fluids, and inadequate mixing may produce an unacceptable product, resulting in waste.

Referring to FIG. 6, preferably, after valving element 60, proceeding in a direction toward control body 36, valve member 56 transitions to a reaction element 62. Preferably, reaction element 62 comprises a first cylindrical skirt 64 that extends radially outward into an enlarged annular base 67, also referred to as a shoulder, having an end facing surface 68 and a control body facing surface 70. Surface 68 is confined to an area extending radially outward from the outside diameter surface of skirt 64 along base 67. However, surface 70 may include the entire area of base 67 extending from central axis 40 radially outward because surface 70 represents the effective area that may be subjected to fluid pressure while valve member 56 is carried in control body 36. This can be more easily shown in FIG. 4 where actuator 54 may apply fluid pressure against surface 70.

It can be seen by those skilled in the art that valving element 60 and reaction element 62 of valve member 56 can also be of integral construction.

Extending from end facing surface 68 in a direction away from control body 36 is an annular lip 51 having an inner surface 53 and an outer surface 55. Lip 51 transitions into a tapered portion 57 wherein preferably inner surface 53 remains parallel to cylindrical skirt 64, and outer surface 55 extends radially inward toward inner surface 53 to form tapered portion 57. Tapered portion 57 terminates at preferably sharpened end 59. Preferably lip 51 is parallel to and concentric with cylindrical skirt 64. Defined by inner surface 53, end facing surface 68 and skirt 64 is an annular pocket 75. As will be explained in more detail below, referring to FIGS. 17 and 17B, pocket 75 collects cavitating bubbles 109 which provide a barrier for directing fluid 66 along valve member 56 and a pressure source for fluid 66 to apply a fluid pressure force to end facing surface 68.

Formed along the outer periphery of annular base 67 is preferably two or more annular grooves 63 for receiving O-rings 80. While valve member 56 is slidably carried in control body 36, O-rings 80 form a fluid tight seal with bore 49. This fluid tight seal permits valve member 56 to be shifted by driven movement which is brought about by selective application of pressurized fluid 66 behind control body facing surface 70 of annular base 67 as will be discussed in more detail below.

To reduce friction associated with the sliding contact between O-rings 80 and bore 49, coated O-rings, or directional O-rings may be used. For example, Bal Seal Engineering Company in Foothill Ranch, Calif. manufactures a directional seal (not shown) which comprises a C-shaped housing member composed of a material having a low coefficient of friction into which a helical spring is placed to maintain the separation between the legs of the C-shaped housing member. A pair of directional O-rings 80 may be preferably installed in opposition so that one and only one "opens up" in response to valve member movement in one direction.

Referring still to FIG. 6, a second cylindrical skirt 72, having a smaller outer diameter than the inner diameter of first cylindrical skirt 64, and carrying a cylindrical sleeve 74 having a plurality of bearings 76, preferably roller bearings, is carried in valve member 56 to minimize friction associated with its movement. It can be seen that preferably valve member 56 actuates along central axis 40 running longitudinally through the center of valve 30, carried in control body 36 and slideably engaging support member 78 of control body 36. One reason for carrying valve member 56 on support member 78 of control body 36 is that O-rings 80 will not "flatten out" over time, which will likely happen if valve member 56 is positioned along a horizontal central axis without benefit of support member 78 to carry the weight of valve member 56, which for an 8" valve can weigh 100 pounds.

The ratio between the cross sectional area of end facing surface 68 to valving element 60 of valve member 56 can vary significantly, but to optimize size while retaining high flow rate capabilities, a ratio approximately as low as 2:1 and approximately as high as 5:1 may be used. More preferably is a ratio approximately between 2:1 and 4:1, with a ratio of about 2:1 most preferably used.

Figure 18:
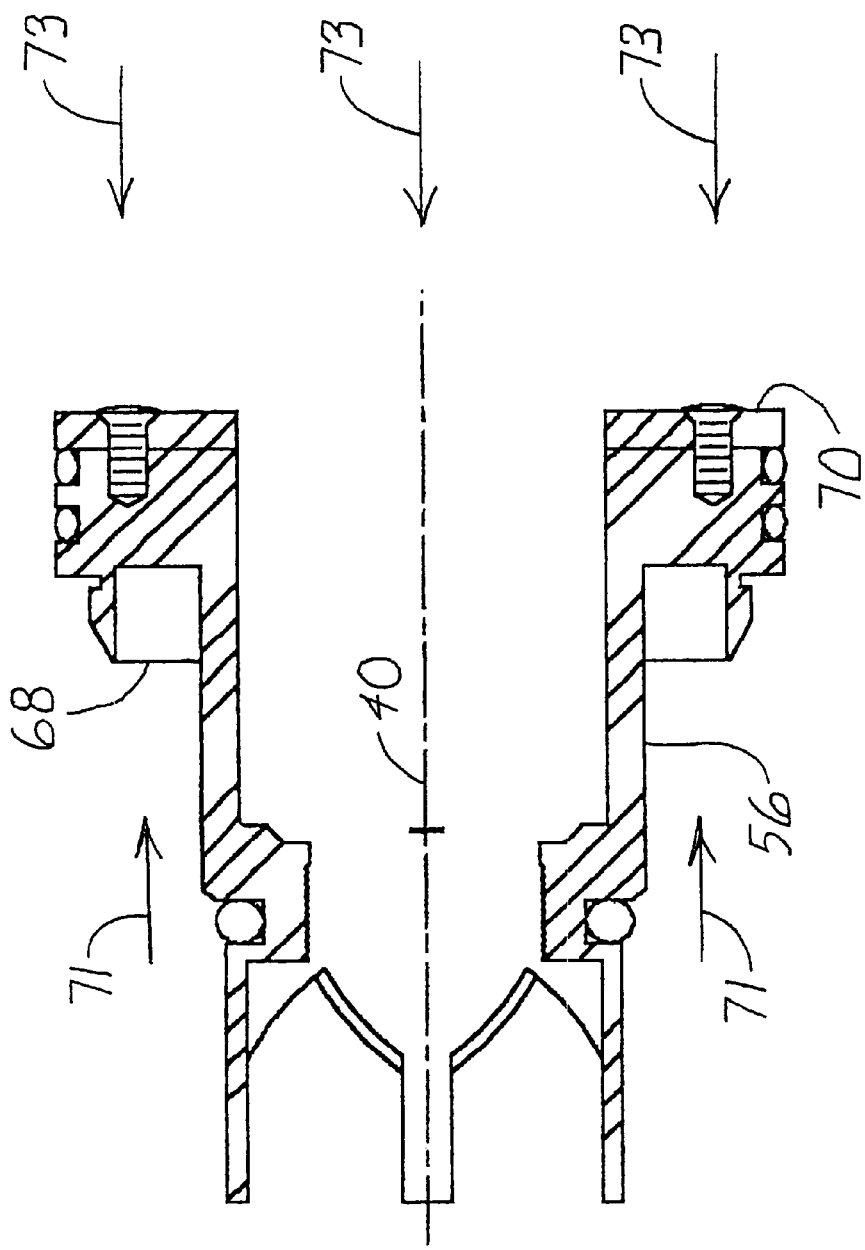
FIG. 18 is an enlarged longitudinal cross section of a valve member taken from FIG. 17 showing forces acting thereon.

Referring to FIGS. 17 and 18, the basis for these ratios is now more fully discussed. As illustrated in FIG. 17, and more specifically, in the region identified as 17B, after fluid 66 enters inlet 42 and is directed around control body 36 along flow passage 37, fluid 66 passes through support structure 38 before flowing past rearward end 43. Upon flowing past rearward end 43, fluid 66 fills flow passage 37. At this position in valve 30, flow passage 37 is radially defined by valve member 56, second portion 47 and outlet housing half 34. Fluid pressure forces are applied by fluid 66 to end facing surface 68 due to circulation and eddy currents.

Although fluid pressure forces are also applied against all flow passage surfaces, including all exposed surfaces of valve member 56, generally only the forces being applied against end facing surface 68 will effect movement of valve member 56 along central axis 40. Moreover, the movement of valve member 56 effected by forces being applied to end facing surface 68 is in a direction away from outlet 44, also referred to as a valve opening position.

Referring to FIG. 18, a diagram is illustrated which represents the opposing forces acting on end facing surface 68 and control body facing surface 70 for urging valve member 56 along central axis 40. As described above, fluid forces applied to end facing surface 68 represent force 71. Opposing force 71 is force 73. Force 73 represents forces applied to control body facing surface 70 by any combination of a first position controlling mechanism 86 (FIG. 17) or fluid, such as fluid 66, introduced between surface 70 and control body 36 (FIG. 17) as will be discussed in more detail below. When one force (71, 73) overcomes the other force, valve member 56 moves along central axis 40 in the direction of the prevailing force. Although forces associated with the weight of valve member 56 are not shown because they depend on the attitude of the valve installation, these forces must be taken into account for control of valve member 56. A ratio of much less than 2:1 will not permit fluid 66 to generate enough force against end facing surface 68 to overcome first position controlling mechanism 86, or the weight of valve member 56 mounted in a vertical position, and thus prevents valve member 56 from moving to a valve opening position. Moreover, a ratio of about 2:1 is necessary to maintain valve member 56 in a stable condition, especially at low flow rates. Such unstable conditions are characterized by rapid, erratic movements of valve member 56, and are referred to as "chatter", "motor boating" and "fluctuation" by those skilled in the art.

Although the preferred embodiment of valve member 56 is cylindrical, it is apparent to one skilled in the art that any portion of valve member 56, including first cylindrical skirt 64, enlarged annular base 67, second cylindrical skirt 72 and cylindrical sleeve 74 are not necessarily circular, and that any number of other geometries may also be used. With the higher ratio ranges, such as 4:1, it is also apparent that an appropriately sized first position controlling mechanism 86 may be required to move valve member 56 toward an end closing position, in case of electrical power failure (fail-safe feature). However, it is apparent that, depending upon the fail safe position required for valve member 56 (open or closed), a ratio can be selected to satisfy that fail safe condition without the need of valve member 56. Although higher ratios than 5:1 may be used, they increase the overall diameter of the valve, substantially increasing the cost of the valve due to increased body material costs and weight.

In an alternate embodiment, referring to FIG. 6, flow conditioning member 82 is connected to end facing surface 84 of valving element 60 of valve member 56 to provide improved downstream fluid flow characteristics. Flow conditioning member 82 accomplishes this by tending to cause the downstream fluid flow to reconverge into a stream directed along central axis 40, thereby improving flow characteristics by more concentrated flow and increased service life of downstream components. An additional benefit from the reconverging fluid stream is improved mixing capability.

Further referring to FIG. 6, a first position controlling mechanism 86, preferably but not necessarily a spring, is disposed between control body 36 and valve member 56, to urge valve member 56 in a direction away from control body 36, toward an end closing position, to ensure a slightly overbalanced condition for valve member 56. As previously described, referring to FIGS. 17, 17B and 18, fluid 66 entering inlet 42 is directed along flow passage 37 toward outlet 44. Upon passing rearward end 43 along flow passage 37, fluid 66, due to circulation and eddy currents, applies force 71 to end facing surface 68 to urge valve member 56 in a direction toward control body 36, toward an end opening position. Thus, first position controlling mechanism 86 may be used to help overcome force 71 applied to valve member 56.

Referring to FIGS. 17 and 17B, fluid flow due to circulation and eddy currents manifest themselves in the form of cavitating bubbles 109. Cavitating bubbles 109 begin forming along end facing surface 68 of valve member 56 due to the increase in valve cross sectional area as fluid 66 continues past core body 36 (FIG. 17B). These bubbles 109 serve as a slippery surface for fluid 66 as it flows around valve member 56, acting as a protective agent against working fluid induced wear. This greatly increases the service life of valve member 56, and additionally, by helping to direct fluid 66 around valve member 56, results in improved downstream flow characteristics.

Further referring to FIGS. 17 and 17B, the increased valve cross sectional area of flow passage 37 corresponds to a portion of region 17B that is downstream of rearward end 43 of control body second portion 47. This portion of region 17B which is defined by support structure 38, end facing surface 68 and reaction element 62 of valve member 56, and inside surface 104 of housing half 34 can provide another beneficial function to downstream valve components and other downstream pipeline components as well. When the valve of the present invention is in a closed position, fluid 66 generally fills flow passage 37. This is because cavitating bubbles 109, which are a result from circulation and eddy currents, do not form when there is no fluid flowing through the valve. Thus, upon sudden movement of valve member 56 to a valve opening position, fluid 66 which generally fills flow passage 37 tends to act as an accumulator. That is, this flow of fluid 66 tends to help minimize the dynamic forces associated with this action, thereby reducing the pulse, also referred to as a slug.

It can be appreciated by one skilled in the art that this improved stability feature may also be present, albeit to a lesser degree because of the presence of cavitating bubbles 109, while working fluid 66 is actively flowing through the valve of the present invention.

Referring to FIGS. 16–18, in an alternate embodiment of the present invention, control apparatus 88, also referred to as a proportional controller of known design, is supported within control body 36 in communication with fluid 66 travelling through the valve through fluid passageway 88a. Control apparatus 88 enables valve member 56 to respond more rapidly to communications for selectively driving valve member 56. All required fluid communications and electrical communications between components inside and components outside of valve 30 are facilitated by using a number of radially outwardly extending ports 52 formed in support structure 38. Although four ports 52 are shown, it is apparent that many more ports may be added, and that it is not required that all four ports 52 be used. To urge valve member 56 toward an end closing position, control apparatus 88 redirects a small amount of fluid 66 from flow passage 37 through fluid passageway 88a, through control apparatus 88, and then to a region defined by control body facing surface 70 of valve member 56 and control body 36 through fluid passageway 88b. This introduction of fluid 66 behind control body facing surface 70 thereby creates a fluid pressure behind control body facing surface 70. This fluid pressure multiplied by the cross sectional area of control body facing surface 70 creates the predominant portion of force 73. The contribution of first position controlling mechanism 86 represents the remaining portion of force 73. Force 71 is the fluid pressure from flow passage 37 applied to end facing surface 68 multiplied by the cross sectional area of end facing surface 68. If force 73 overcomes force 71, valve member 56 is urged toward an end closing position.

Similarly, to urge valve member 56 toward an end opening position, control apparatus 88 may vent fluid 66 from behind control body facing surface 70 through fluid passageway 88*c*, through control apparatus 88, then to another location. This vented fluid 66 can be redirected into the pipeline at outlet housing 34 as illustrated in FIG. 17 at 90. Alternately, although not shown herein, fluid 66 could also be redirected further downstream of valve 30 or collected outside of valve 30. This venting reduces the amount of fluid pressure applied behind control body facing surface 70 which thereby reduces the magnitude of force 73. Again referring to FIG. 18, once force 71 overcomes force 73, valve member 56 is urged toward an end opening position. Thus, valve member 56 can be selectively driven to position valve member 56 for controlling the flow of working fluid 66 through valve 30 by regulating the flow of fluid 66 from control apparatus 88.

One skilled in the art can appreciate that a valve control system is formed by combining the valve of the present invention with control apparatus 88. Additionally, one can appreciate that this control apparatus 88 could also be an adjustable orifice valve. Moreover, one can appreciate that this combination of the valve of the present invention with control apparatus 88 can be configured for automated response.

Referring to FIG. 17, a control system for the valve of the present invention is disclosed wherein precise control of directing working fluid 66 using control apparatus 88 is effected through electrical connection 88*d* preferably through the use of a linear variable potentiometer 92, hereinafter referred to as potentiometer, or similar electrical controlling device that is known and widely used in the art. Potentiometer 92 preferably maintains a linear relationship between pressure level and voltage. Potentiometer 92 operates on extremely low current, such as 4–20 milliamps, which can be safely used in an environment with gasoline vapors, and which correlates a pressure level in control apparatus 88 to a voltage setting on potentiometer 92. One may rotate dial 94 on potentiometer 92 in a direction that increases the electrical voltage, which is conveyed to control apparatus 88 through electrical connection 88*d*, thereby effecting an increased pressure level within control apparatus 88. Control apparatus 88 through fluid passageway 88*b* then directs fluid 66 to the region defined by control body facing surface 70 and control body 36 until this increased pressure level is reached in that region to urge valve member 56 toward an end closing position.

One may also rotate dial 94 in a direction opposite that previously described to decrease the electrical voltage, which is conveyed to control apparatus 88 through electrical connection 88*d*, thereby effecting a decreased pressure level within control apparatus 88. The decreased pressure level in control apparatus 88 is then compared with the pressure level of fluid passageway 88*b* which fluidly communicates with the region defined by control body facing surface 70 and control body 36. Fluid 66 is then redirected through passageway 88*c* to reduce the pressure level in this region until the pressure level in this region is equal to the pressure level in control apparatus 88. Referring to FIGS. 17 and 18, when force 71 overcomes force 73, as previously described, valve member 56 is urged toward a valve opening position. Further, minute rotations of dial 94 can be calibrated to correspond to minute pressure adjustments, which allow one to directly control valve member 56 to a level unprecedented for a co-axial control valve of this size. Tests have revealed regulating flows down to 1.0 cubic centimeter per minute, barely sufficient to suspend a polyurethane ball one inch in diameter in a close-fitting vertical cylindrical tube.

Figure 25:
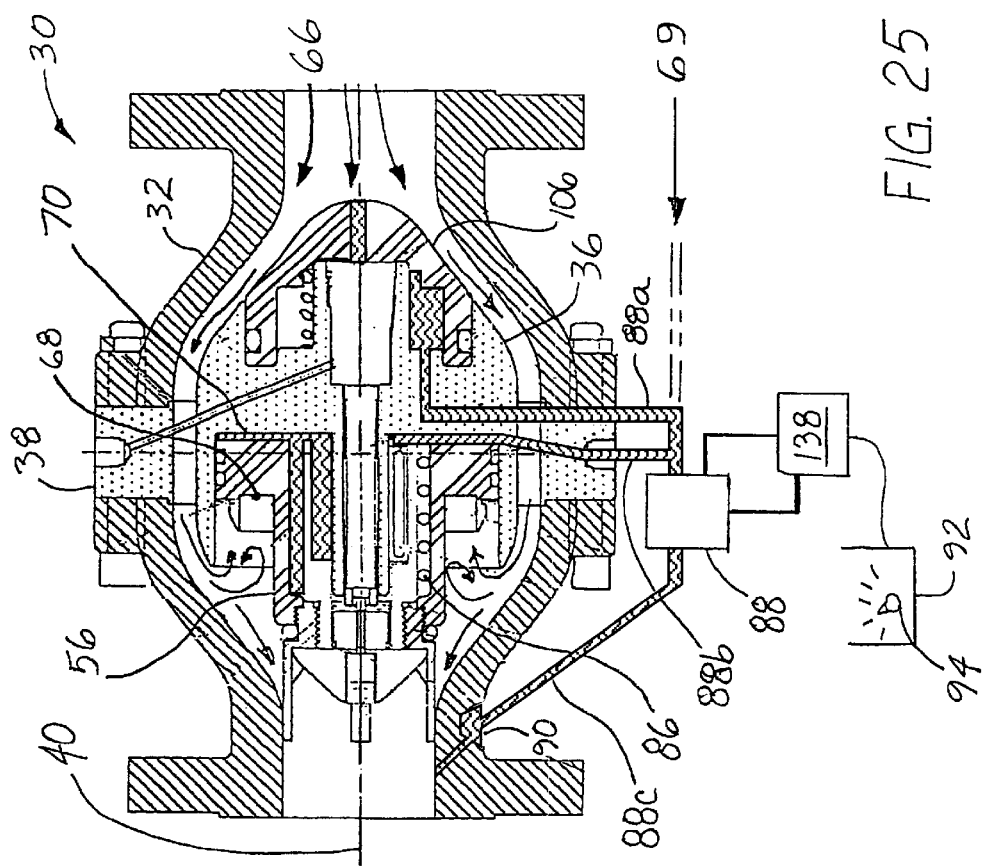
FIG. 25 is a longitudinal cross section of an alternate valve component arrangement taken along line 4—4 of FIG. 2.

It can be similarly shown in other alternate embodiments, referring to FIG. 25, that control apparatus 88 may be located outside valve 30, and that control apparatus 88 may use an externally supplied pressurized fluid source 69, such as pneumatic air or liquid, instead of working fluid 66 to effect such precise control of fluid flow through valve 30.

Additionally, it can be seen that if the fluid used in control apparatus 88 is fluid 66, such fluid can be reintroduced into the pipeline downstream, or upstream of valve 30, or collected externally of the pipeline.

Referring to FIG. 25, a pilot valve 138 can be used with potentiometer 92 to effect control over control apparatus 88. A pilot valve is a device for controlling the flow of an auxiliary fluid used to amplify the power of a controller of a larger system. This permits the use of a smaller valve, such as pilot valve 138 which requires less power to operate than a larger valve, that in this instance is contained within control apparatus 88. It is further be appreciated that pilot valve 138 can be automatic or manually operated.

In addition to the above process itself, it is also the location of the flow measuring means with respect to the valve itself that enables such rapid response time, in addition to the precise control. Referring to FIG. 15, pressure of working fluid 66 in the pipeline can be sensed at support structure 38 using any one of ports 52, preferably located at the center of valve 30. A flow measuring means 111, such as a transducer, may engage port 52 to sense fluid 66 travelling through passage 48. Flow measuring means 111 may then send an electrical signal through electrical connection 88*e* to control apparatus 88. Simultaneously, a pressure measuring means, such as a transducer (not shown) could similarly engage another port 52 to sense the pressure level of fluid 66 traveling through passage 48. Therefore, there is essentially no time delay from the instant the pressure measuring means sends an electrical signal to control apparatus 88, to the time control apparatus 88 sends an electrical signal to a pressure regulating means which is contained within control apparatus 88 to move valve member 56 to control fluid flow through valve 30. In industrial controlled processes, initiation of new settings, i.e, a considerably increased flow rate, generally requires several minutes to allow a fluid system circuit to reach equilibrium. However, similar tests conducted on an experimental fluid system circuit using a 2-inch control valve of the present invention, making flow rate adjustments to reach flow rate levels unachievable with conventional globe valves, i.e., 200 gallons/min., achieved equilibrium in less than ten seconds.

Figure 19:
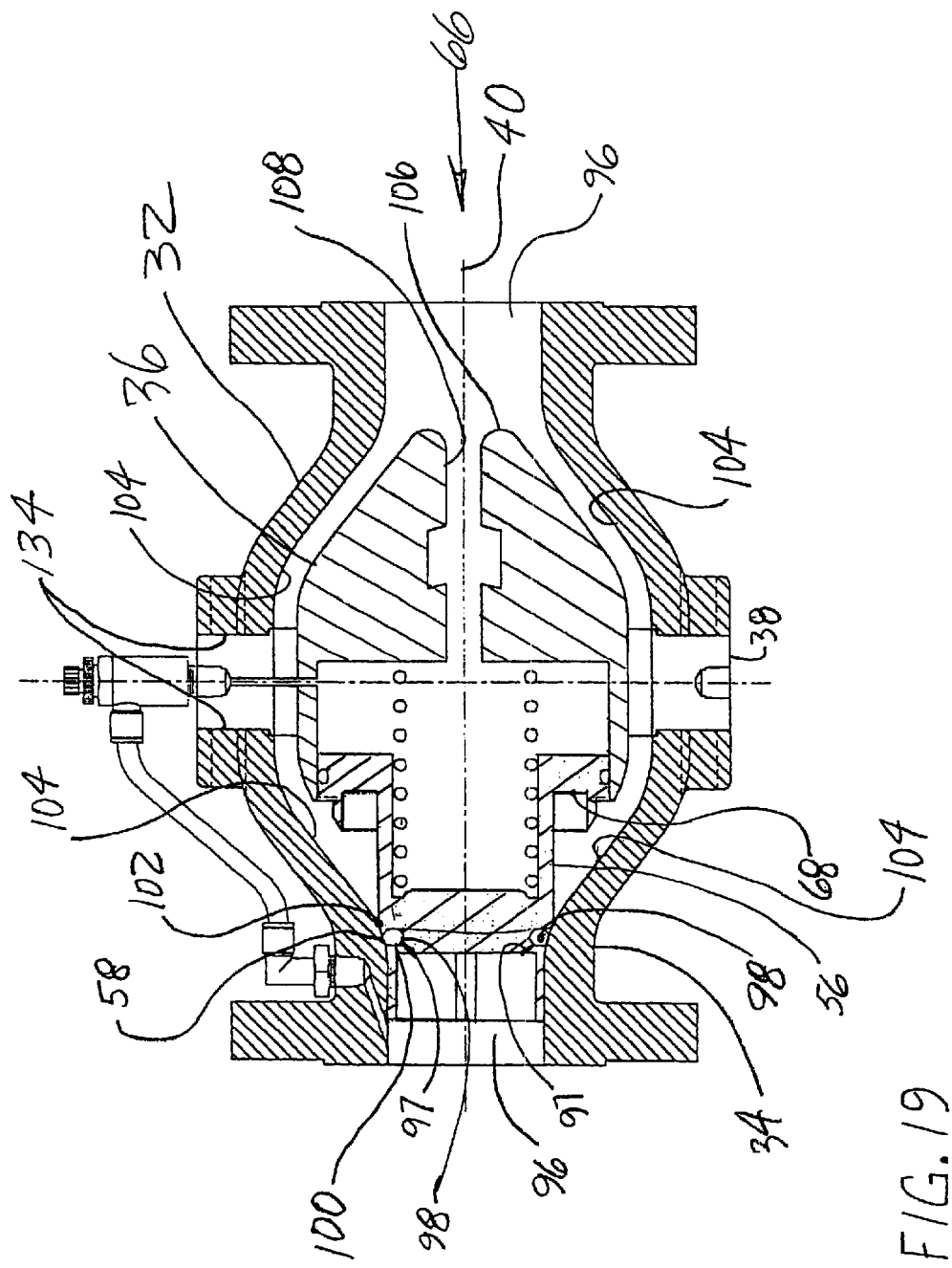
FIG. 19 is a longitudinal cross section of an alternate valve component arrangement taken along line 4—4 of FIG. 2.

An additional factor relating to response time is the amount of travel required by valve member 56 to effect flow control. Referring to FIG. 19, valve member 56 actuates approximately one quarter of the valve diameter along its travel axis, preferably central axis 40, to effect fill operational movement. Therefore, a 2-inch valve of the present invention must travel approximately one half inch to effect the total range of fluid flow through valve 30. Moreover, resistance must be held to a minimum. This is accomplished, for example, by adding a cylindrical sleeve 74 containing bearings 76 to valve member 56 as illustrated in FIG. 6 and discussed above.

Additionally, resistance from seals associated with moving valve member 56 toward an end opening position after valve member 56 has been completely closed, can experience drag, thereby posing a response delay. Referring to FIG. 19, an alternate embodiment of the valve of the present invention utilizes a "kiss seal" that allows seal 98 to slide within an end bore 96 of either end housing half 32 or 34 with low friction, especially upon engaging valve seat 58. This is due to several things. Seal 98, retained in recess 100 of valve member 56 is kept in a pressure balanced condition by the contour of recess 100 and numerous apertures 97 formed along recess 100 which allow differential pressure to escape from behind seal 98, which may otherwise force seal 98 radially outward into the fluid flow stream. In extreme cases seal 98 has been caught in this stream and removed from its recess. Thus, this pressure balanced condition helps retain seal 98 in its installed position. Shoulder 102 formed in valve member 56 between seal 98 and end facing surface 68 makes intimate conformal contact with inside surface 104 of housing 34, also known as the wetted surface of the valve. Preferably, shoulder 102 has been precisely machined to essentially effect a leakproof seal by itself without wedging itself inside the wetted surface, and additionally shoulder 102 acts to prevent over-actuation of valve member 56 in the end closing position. It can also be appreciated by one skilled in the art that this configuration may be used for fire-safe applications due to the ability of valve member 56 to halt fluid flow without the need for a seal, especially under elevated temperature conditions that can destroy such seals.

It can be appreciated by one skilled in the art that valve member 56 may also be positioned between control body 36 and housing half 32. Therefore, it can also be appreciated that shoulder 102 formed in valve member 56 between seal 98 and end facing surface 68 makes intimate conformal contact with inside surface 104 of housing 32.

Figure 21:
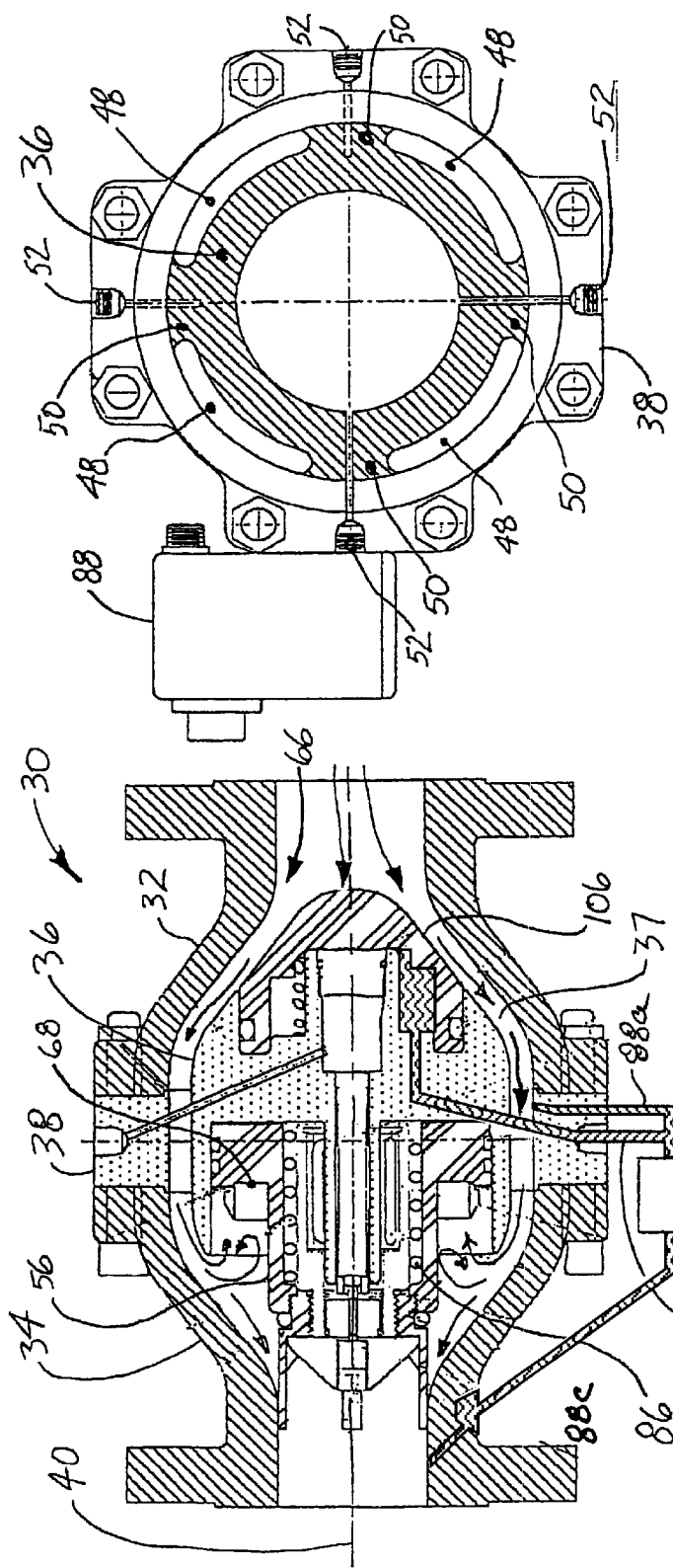
FIG. 21 is a transverse cross section of an alternate valve component arrangement taken along line 5—5 of FIG. 1.

Referring to FIGS. 19 and 21, a control body 36 surface facing opposite that of valve member 56 comprises an elongated, preferably blunt flow control member 106 to direct fluid flow through control body 36. In this alternate embodiment of a co-axial valve, fluid flow 66 is directed through control body 36 and through support structure passages 48. In the preferred embodiment, flow control member 106 absorbs a portion of the energy of the incoming fluid, and smoothly directs it around control body 36 (FIG. 4).

There are many other embodiments of flow control member 106 of which a non-inclusive listing is as follows:
1) as illustrated in FIG. 4, flow control member 106 can be integral to control body 36;
2) as illustrated in FIG. 6, flow control member 106 can also be used with a second position controlling mechanism 110 disposed between control body 36 and flow control member 106 and carried in control body 36, second position controlling mechanism 110 urging flow control member 106 toward an end closing position, thereby enabling flow control member 106 to act as a pulsation dampener;
3) as illustrated in FIG. 17, flow control member 106 can be a fixed, separate component, alternatively referred as a flow control member portion, carried in control body 36;
4) as illustrated in FIG. 17A, flow control member 106 can have a recess 107 formed therein to collect upstream bubbles for forming a boundary layer to help protect flow control member 106 and other internal surfaces of valve from fluid-induced wear;
5) as illustrated in FIG. 19, flow control member 106 can have an aperture 108 formed therethrough to permit fluid flow through control body 36 and behind valve member 56.

Figure 20:
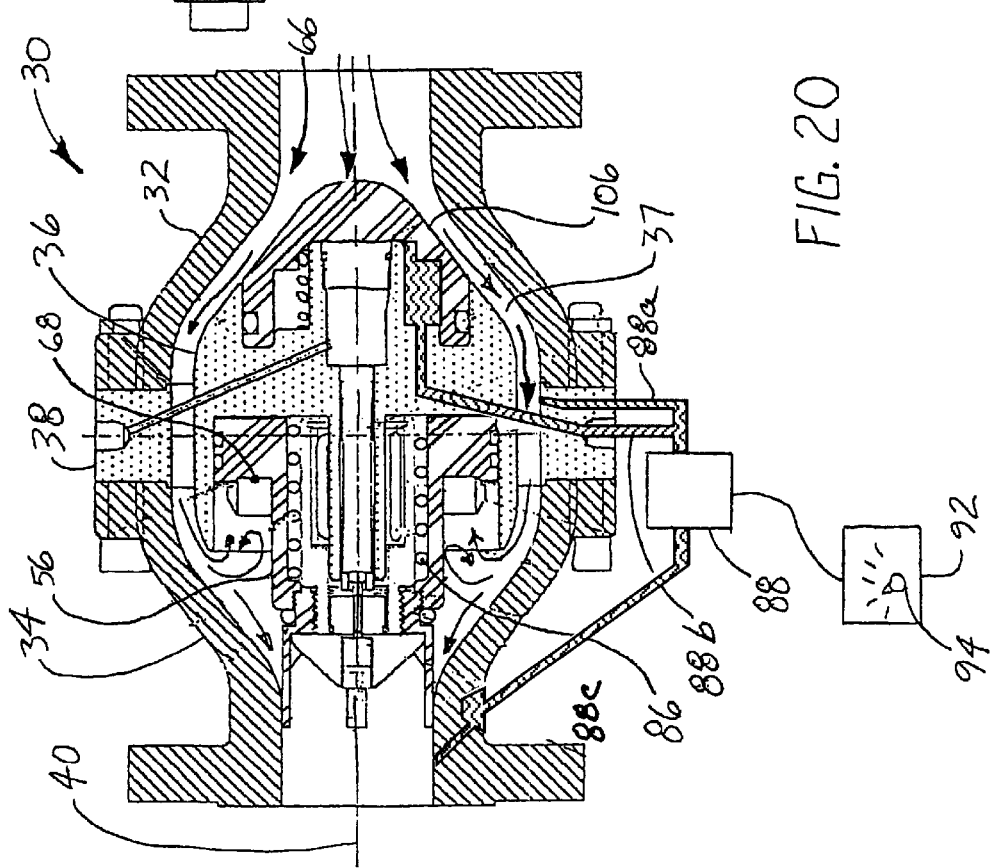
FIG. 20 is a longitudinal cross section of an alternate valve component arrangement taken along line 4—4 of FIG. 2.

Flow control member 106 can be disposed between control body 36 and inlet housing half 32 (FIGS. 4, 6, 15, 17 and 19) or, as is apparent to one skilled in the art, disposed between control body 36 and outlet housing half 34 (not shown). Additionally, referring to FIGS. 20 and 21, it is also apparent that flow control member 106 can be configured for use with control apparatus 88 and potentiometer 92 either in combination with valve member 56, or configured for use by itself, similarly using support structure ports 52 to communicate fluidly or electrically through valve 30. That is to say, that flow control member 106 disposed between control body 36 and housing end opposite valve member 56, is carried in control body 36, and is slideably actuated preferably along central axis 40 between an end opening position and an end closing position in inlet housing half 32. Control apparatus 88 redirects a portion of a pressurized fluid through at least one of ports 52 in support structure 38 through fluid passageway 88a to a region defined by control body 36 and flow control member portion 106 through fluid passageway 88b. Redirecting fluid flow to this region, subject to venting of fluid flow from this region by control apparatus 88 through fluid passageway 88c as previously discussed, causes flow control member portion 106 to be controllably driven to position flow control member portion 106 for controlling the fluid flow through valve 30.

Figure 22:
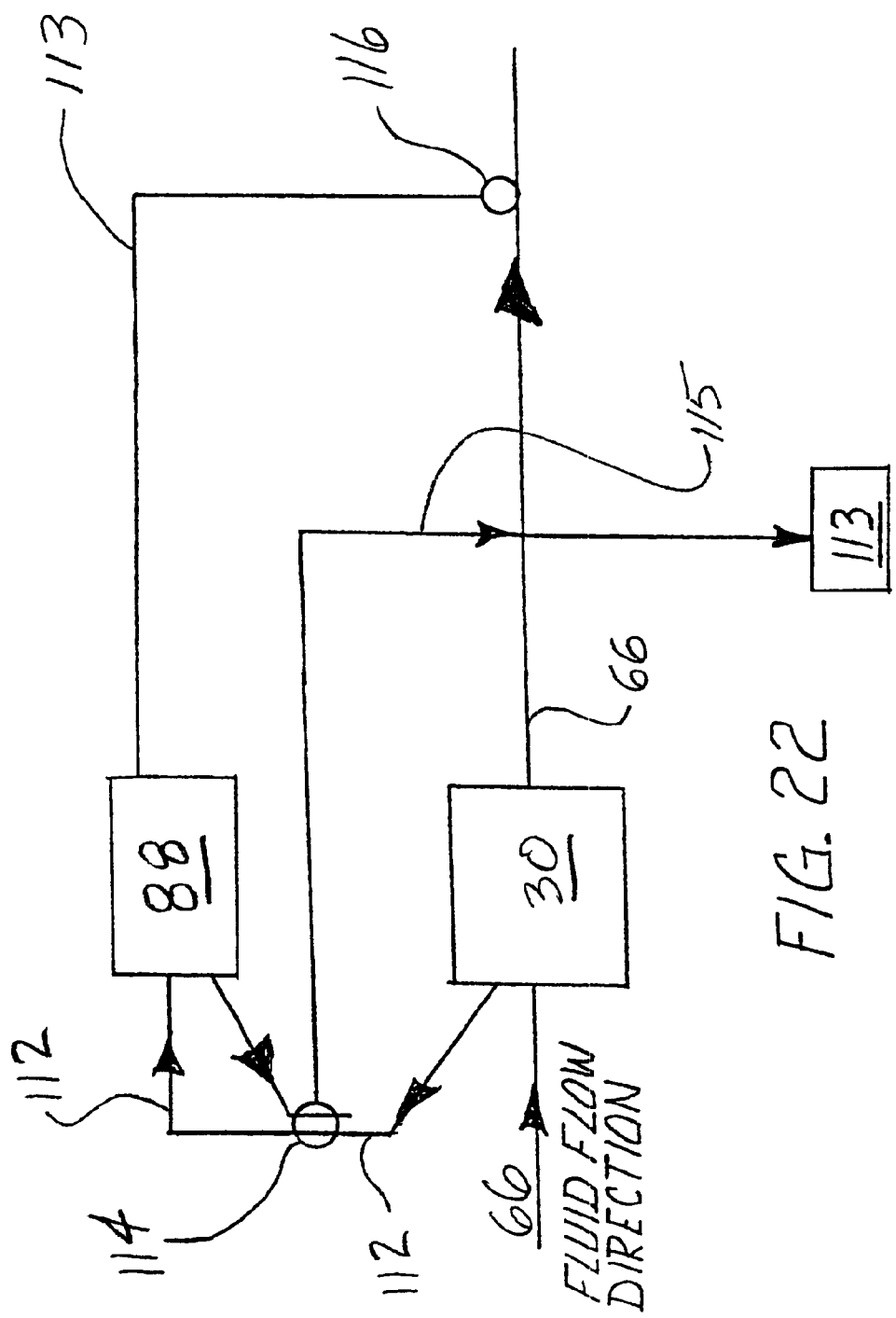
FIG. 22 is a diagram illustrating feedback control including a fluid control, second valve, and a transducer of an alternate valve component arrangement to achieve fluid flow control.

Referring to FIG. 22, a feedback control is illustrated for the above valve embodiment. Working fluid 66 enters valve 30. A small portion of working fluid 66 becomes redirected working fluid 112 and is fed into control apparatus 88. A second valve 114 placed before control apparatus 88 selectively controls the flow of vented fluid 115, depicted here as being reintroduced downstream of valve 30, although it can be seen that vented fluid 115 can be separately collected in vessel 113 and not reintroduced into the system, or pipeline. Control of second valve 114 is based on comparative fluid parameter readings, such as pressure, from another location, using a measuring device such as downstream transducer 116, which conveys an electrical signal through line 113 to control apparatus 88 which then instructs valve 114 to actuate through electrical connection 117.

Figure 23:
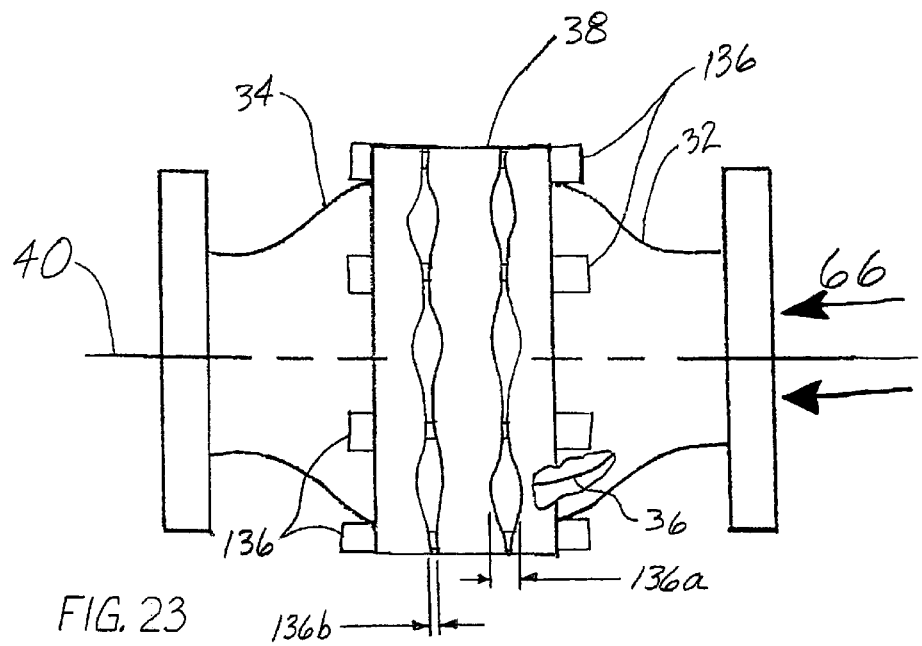
FIG. 23 is a side elevation view of an alternate valve housing construction illustrating exaggerated deformation of valve housing flanges after installing mechanical fasteners at a desired torque, to help absorb fluid pressure fluctuations.
Figure 24:
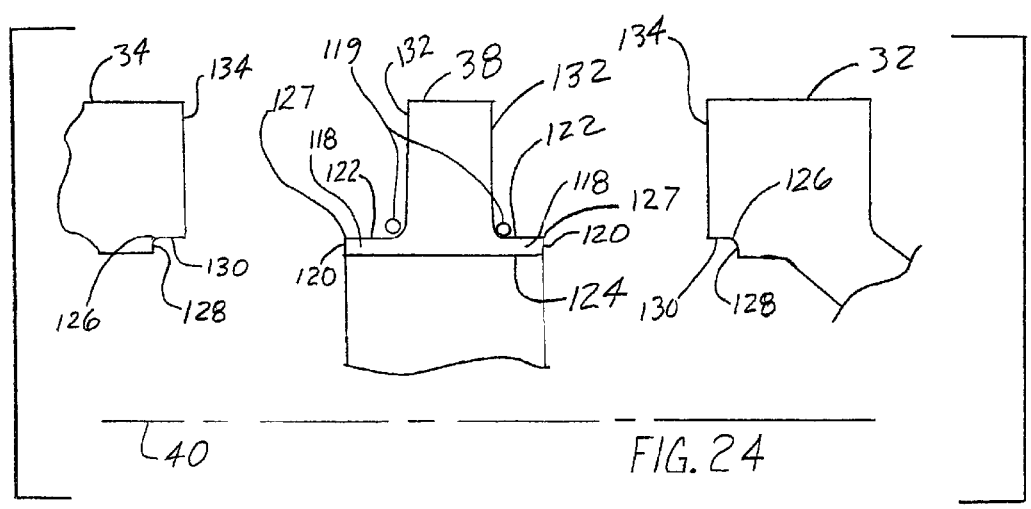
FIG. 24 is an enlarged partial view of a metal-to-metal seal helping to absorb fluid pressure fluctuations.

As discussed above, flow control member 106 can function as a pulsation dampening device against fluid flow pulsation surges. This helps reduce fluid stresses acting on valve components and downstream components, significantly increasing the service life of all these components. Referring to FIGS. 23 and 24, an additional dampening effect is obtained from the interface between support structure 38 and housing halves 32 and 34. Support structure 38 secures control body 36 in communication with working fluid 66 and is disposed between the two housing halves. Each of two opposing raised lip regions 118 extends outwardly from support structure 38 in a direction preferably parallel to central axis 40 of the preferred embodiment, having an end 120, an outer surface 122 and an inner surface 124. Inner surface 124 forms an outer periphery of the wetted perimeter, or portion of the perimeter of a pipe or channel covered by flowing fluid 66 of valve 30. Lip regions 118 interface with corresponding preferably annular recesses 126, collectively forming an outer periphery of the wetted perimeter of valve housing halves 32 and 34. Each lip region 118 contacts control body facing surface 128 of each valve housing half 32 and 34, and each outwardly facing surface 122 of lip region 118 contacts an inwardly facing surface 130 of each housing half 32 and 34. Moreover, sharp edge 127 of lip region 118 deformably interfaces inwardly facing surface 130 of each housing half 32 and 34, thereby elastically deforming each lip region 118 radially inward to form an essentially seamless wetted surface in that area, forming a metal-to-metal seal. It is noted that this seal is sufficient to provide a non-leaking joint, but support structure seal 119 as illustrated on FIG. 24 may certainly be used.

Further referring to FIGS. 23 and 24, lip region 118 has a greater protruding length from an end facing flange surface 132 of support structure 38 than a corresponding depth from support structure facing annular recess surface 128 to a support structure facing flange surface 134 in each housing half 32 and 34. This means that when support structure 38 is assembled onto housing halves 32 and 34, there exists a gap between each end facing flange surface 132 of support structure 38 and each support structure facing flange surface 134 of each housing half 32 and 34. Support structure 38 is assembled between housing halves 32 and 34 using a plurality of fastening devices 136, such as nuts and bolts, which are preferably evenly distributed outside the outer periphery of the wetted perimeter of the valve to secure support structure 38 to housing halves 32 and 34. Fastening devices 136 are installed using a desired, predetermined torque level to allow flexure of housing halves 32 and 34 and support structure 38 to help dampen fluid flow fluctuations. The result of the installation is exaggeratedly illustrated on FIG. 23. The narrower gaps between housing halves 32 and 34 and support structure 38 that are in-line with fastening devices 136 are depicted at 136b. The wider gaps between housing halves 32 and 34 and support structure 38, corresponding to regions generally located between adjacent fastening devices 136, are depicted at 136a.

It can be seen by one having skill in the art that this joint formed between lip region 118 of support structure 38 and annular recess 126 of housing halves 32 and 34, although preferably circular in cross section, may still function with any number of geometries. It can additionally be seen that fastening devices 136 may not be evenly distributed.

Referring to FIG. 6, in an alternate embodiment of the present invention, a valve member position detecting device 140, which may be an electronic sensor such as a linear variable differential transformer (LVDT) or the like, may be used to show the relative proportion that the valve of the present invention is open or closed by electrically indicating the position of valve member 56 within its travel along central axis 40. Position detecting device 140 is threadedly engaged in bore 142 of control body 36. Engagement probe 144 of position detecting device 140 threadedly engages threaded bore 146 of flow conditioning member 82.

It can be seen by one skilled in the art that valve member position detecting device 140 can also be threadedly engaged with valving element 60, reaction element 62, or second cylindrical skirt 72 as long as engagement probe 144 of position detecting device is connected to and thereby senses the position of valve member 56.

Figure 26:
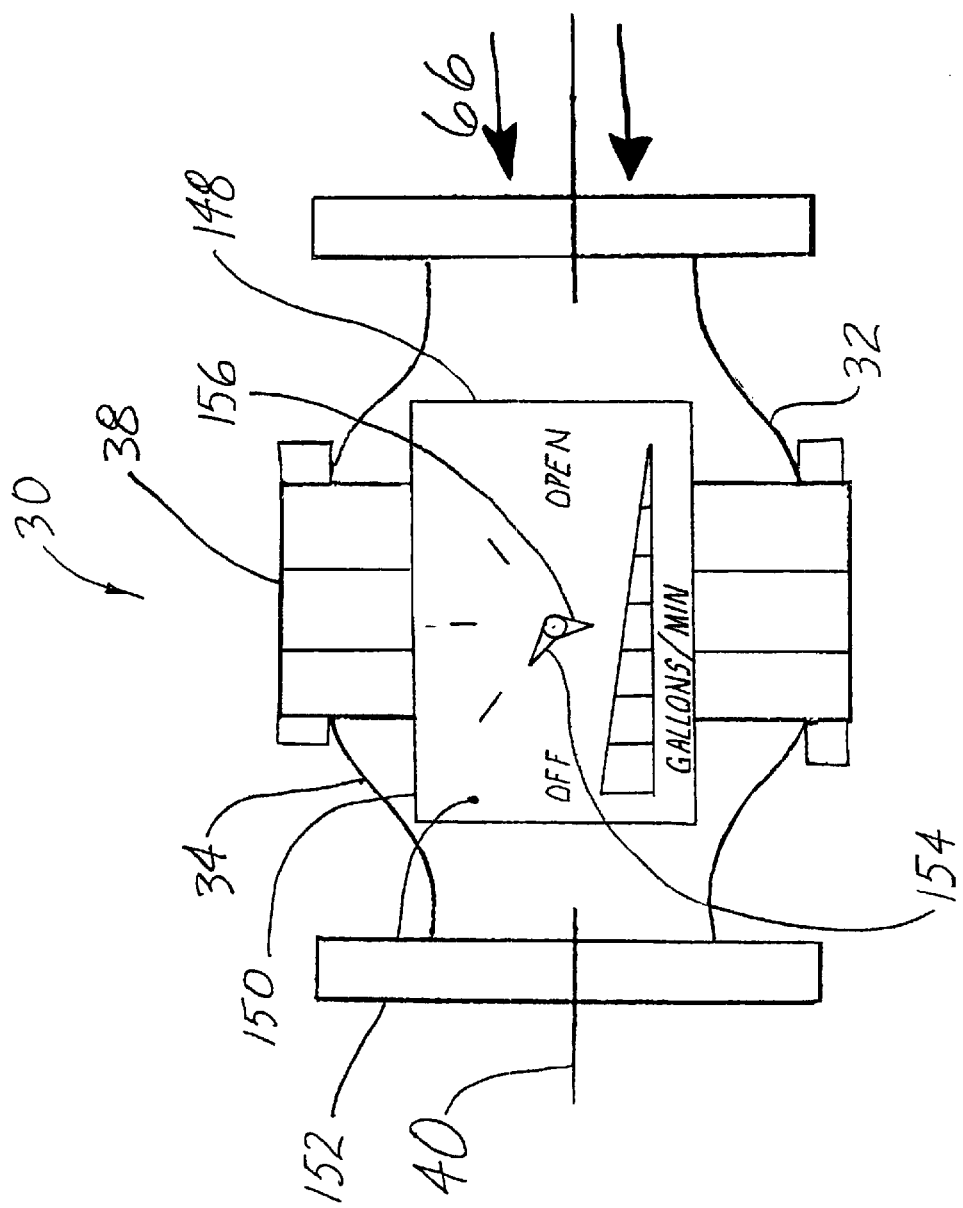
FIG. 26 is a side elevation view of a valve having a viewing apparatus.

Referring to FIGS. 15, 16 and 26, visual apparatus 148, also referred to as monitor, may be used to illustrate various valve and fluid parameters for ease of viewing by a user. Monitor 148 comprises a viewing housing 150 located externally of valve 30 in communication with valve member 56 of valve 30 and fluid 66 flowing through valve 30 via ports 52 in support structure 38. Further referring to FIG. 26, viewing face 152 is contained within viewing housing 150 and has a plurality of fluid parameter displays with calibrated markings and corresponding first and second analog pointing members 154 and 156, respectively. These pointing members identify the magnitudes of the valve or fluid parameter by pointing to the corresponding calibrated marking on viewing face 152. Referring to FIG. 26, among the valve parameters that may be conveniently illustrated include the relative proportion that the valve is open or closed by indicating the relative position of valve member 56 within its travel envelope along central axis 40. This can be accomplished by valve member position detecting device 140 being an LVDT and conveying an electric signal that is converted to the position of pointing member 154. Alternately, movement of pointing member 154 could also be accomplished by mechanical linkage (not shown), of known design, connected to first pointing member 154. Also depicted on the lower portion of monitor 148 is the rate of fluid flow through valve 30. An analog means of visually representing the relative position that the valve is open or closed and of the rate of fluid flow through the valve is also illustrated on FIG. 26 by second pointer member 156.

Figure 27:
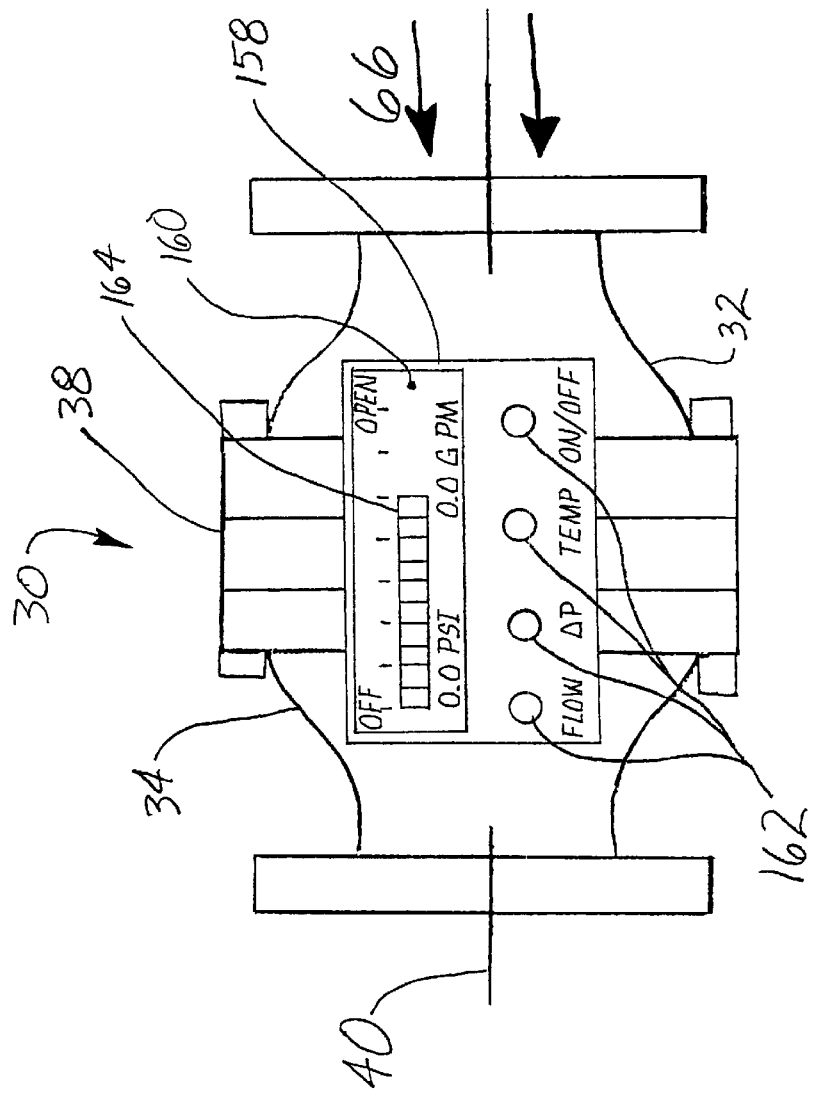
FIG. 27 is a side elevation view of a valve having a viewing apparatus.

FIGS. 15 and 27 illustrate an alternate embodiment of visual apparatus 158, also referred to as a console, which may be used to quickly and conveniently illustrate various valve and fluid parameters. Console 158, located externally of valve 30 in communication with valve member 56 of valve 30, comprises viewing face 160 having a plurality of user-operated buttons 162 corresponding to fluid and valve parameters of fluid 66 flowing through valve 30. Fluid parameters, which are obtained from sensing means which are converted to electrical signals and converted to digital displays, are of known design. To illustrate to a distant observer the extent to which the valve is open or closed, an illuminated band 164 extends in one direction with respect to the overall viewing face 160 size in proportion to the extent valve member 56 is open. The flow rate through the valve may also be depicted numerically on viewing face 160. Other fluid parameters that may be displayed in numerical format include but are not limited to flow rate, change in pressure, and temperature.

As is apparent to one skilled in the art, the format for viewing can be either digital or analog. Additionally, it is also apparent that light emitting diode or liquid crystal visual apparatus display can also be used. It is also apparent that other fluid parameters that can be electrically sensed and displayed numerically, such as fluid velocity through the valve, can also be measured and displayed. It is also apparent that a mix of digital and analog displayed fluid parameters is possible.

The term fluid as used in the present description and claims is interpreted to include either liquid, gas or vapor.

Referring to FIGS. 4, 6, 15, 19, 20 and 25 it can be seen by one having skill in the art that with all the possible combinations of valve members 56 and flow control members 106, including the possibility that a valve member 56 and a flow control member 106 or two flow control members 106 can be employed in a valve design, that the valve of the present invention can be utilized in an unprecedented number of ways. This includes, but is not limited to the following: shut-off valve, check valve, flow meter, safety valve, relief valve, safety relief valve, velocity control valve, pressure control valve, pulsation dampener and spike attenuator valve, and temperature control valve.

In view of the foregoing description of the present invention and practical embodiments it will be seen that the several objects of the invention are achieved and other advantages are attained. The embodiments and examples were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

The breadth and scope of the present invention should not be limited by any of the above-described exemplary embodiments, but should be defined only in accordance with claims of the application and their equivalents.

What is claimed is:

1. A precision flow control valve comprising a housing having a fluid inlet at one fitting end and fluid outlet at another fitting end, a control body supported within the housing by support structure bridging between the control body and the housing, the housing and control body together defining a flow passage communicating with the fluid inlet and outlet for flow of fluid through the valve from the inlet to the outlet in a direction of flow along fluid paths symmetric with respect to an axis of the control body, the control body and support structure being streamlined so as not to interfere substantially with said flow of fluid along the flow paths, the housing and a leading end of the control body extending to a rearward end define a flow passage cross sectional area $kA_i$ relating to an effective inlet cross sectional area $A_i$ and wherein k is a constant from about 1.1 to about 1.2, the flow paths are symmetric about at least one axis perpendicular to the direction of fluid flow, at least one valve member having a fitting end facing surface and a control body facing surface carried by the control body in an orientation for being shifted by driven movement along said axis relatively toward and away from the fitting end for control of fluid passing through the fitting end, an actuator within the control body for driving the valve member along said axis, at least one port extending through the support structure for communicating with the actuator and providing for control of the actuator.

2. A precision co-axial control valve for in-line flow control of fluid, comprising a housing including an inlet side housing half having a fluid inlet at one fitting end and an outlet side housing half having a fluid outlet at the other fitting end, the housing defining a central axis extending between the fitting ends of the housing, a control body supported within the housing coaxial with the central axis by a support structure bridging between the control body and the housing, the support structure securing the control body in communication with the fluid having an inlet facing surface, an outlet facing surface, and an inner peripheral surface radially outward from the control body radially surrounding the control body, the housing halves, the support structure and control body together defining a flow passage communicating with the fluid inlet and outlet for flow of fluid through the valve from the inlet to the outlet wherein the flow passage defines flow paths in mutually symmetric relationship and extending around the control body, the support structure being configured so as not to interfere substantially with said flow of fluid along the flow paths, the control body having upstream and downstream ends coaxial with the central axis, the upstream end being proximate the inlet and the downstream end being proximate the outlet, the housing and the upstream end of the control body extending to the downstream end define a flow passage cross sectional area $kA_i$, relating to an effective inlet cross sectional area $A_i$ and wherein k is a constant from about 1.1 to about 1.2, the fluid outlet defining a valve seat, the valve seat being concentric with the central axis, the control body having a support member extending along the central axis toward the downstream end to carry a valve member in an orientation for being shifted by driven movement along the central axis relatively toward and away from the valve seat for achieving control of fluid passing the valve seat, each housing half having a control body facing surface and a fitting end facing surface, operable to pass fluid selectively from the inlet side to the outlet side, the support structure disposed between the inlet side housing half and the outlet side housing half further having opposing raised lip regions extending from the inner peripheral surface toward each fitting end, deformably interfacing with corresponding recesses formed in an inner periphery of the control body facing surface of each housing half to effect a metal-to metal seal, a plurality of fastening devices outside the peripheral surface of the support structure to secure the support structure to the housing halves, the fastening devices tightened to a desired torque to allow flexure of the housing halves and the support structure to help dampen fluid flow surges, an actuator within the control body for driving the valve member along the central axis, at least one port extending through the support structure for communicating with the actuator, and a control apparatus externally of the valve in communication with a fluid source, the control apparatus being in communication with the valve through the port, the control apparatus directing fluid under pressure to the valve to effect closing of the valve, the control apparatus also having selective communication with a vent for removing an amount of fluid being communicated to the valve thereby reducing the pressure being communicated to the valve, to effect opening of the valve, an electrical controlling device in communication with the control apparatus, the electrical controlling device correlating a pressure level to a voltage level having an adjustment means, wherein adjustment of the electrical controlling device resulting in an increased voltage level and correspondingly increased pressure level, causing the control apparatus to direct fluid under pressure to the valve to effect closing of the valve, and adjustment of the electrical controlling device resulting in a decreased voltage level and correspondingly decreased pressure level, causing the control apparatus to vent an amount of fluid being communicated to the valve thereby reducing the pressure being communicated to the valve, to effect opening of the valve.

3. A valve as set forth in claim 2 further comprising a flow control member carried by the control body opposite that of the valve member, a second position controlling mechanism disposed between the control body and the flow control member and carried in the control body, the second position controlling mechanism urging the flow control member toward an end closing position, acting as a pulsation dampener.

4. A fluid control valve of coaxial configuration comprising a valve housing having joined housing portions including an upstream housing portion having a fluid inlet and a downstream housing portion having a fluid outlet, the valve housing defining a longitudinal axis, a control body located within the valve housing coaxially relative to the longitudinal axis, a support structure securing the control body to the valve housing with the control body in communication with the fluid such that fluid passing from the inlet to the outlet passes around the control body wholly within the valve housing, the housing portions, the support structure and the control body together defining a flow passage communicating with the fluid inlet and outlet for coaxial flow of fluid through the valve from the inlet to the outlet coaxially relative to the longitudinal axis, the housing halves, the support structure, and a leading end of the control body extending to a rearward end of the control body defining for the flow passage a flow passage cross sectional area $kA_i$, relating to an effective inlet cross sectional area $A_i$ and wherein k is a constant from about 1.1 to about 1.2, the support structure being configured so as not substantially to interfere with said flow of fluid from the inlet to the outlet by permitting smooth flow of fluid within the flow passage, the control body having upstream and downstream ends respectively withing the upstream and downstream housing portions, one of said housing portions having a control valve facing portion, a valve-carrying member extending from the control body toward the control valve facing portion, at least one valve member carried by the valve carrying member in an orientation for being shifted by driven movement along a control axis, relatively toward and away from the control valve facing portion for flow control of fluid passing from the inlet to the outlet, a fluid-driven valve actuator within the control body for driving the valve member along the control axis, the valve member including a valving element having a control body-facing surface and an opposing outer facing surface, the outer facing surface of the valving element forming a reaction surface against which fluid flowing about the control body in the flow passage will react for urging the valve member in a direction opposite to the direction of fluid flow in the flow passage, a ratio of the reaction surface area to a surface area of control body-facing surface being between about 2:1 and about 5:1, at least one control port extending through the support structure for communicating with the valve actuator, a fluid control external of the housing for controllably providing a control fluid to the valve actuator under pressure through the control port for causing the valve member to be controllably driven by the valve actuator along the control axis for precise control of fluid though the valve.

5. A fluid control valve as set forth in claim 4 wherein the control axis is coincident with the longitudinal axis of the valve housing and the fluid control operates in a mode for selecting increasing or decreasing pressure communicated through the control port for respectively decreasing or increasing the fluid flow through the valve element by moving the valve element in respectively closing and opening directions which are respectively outward from and toward the control body.

6. A fluid control valve as set forth in claim 5 wherein the valve element is located at the downstream end of the control body.

7. A valve as set forth in claim 4 wherein the support structure is disposed between the upstream and downstream housing portions, the housing portions each provide opposing lip portions deformably interfacing with corresponding recesses formed in an inner periphery of the control body facing surface of each housing portion to effect a metal-to metal seal, a plurality of fastening devices outside the peripheral surface of the support structure to secure the support structure to the housing halves, the fastening devices allowing relative flexing of the housing portions, whereby to help dampen fluid flow surges within the housing portions.

8. A coaxial control valve for precisely controlling fluid flow, comprising:

a housing having a fluid inlet at one fitting end and fluid outlet at another fitting end, the housing having a support structure for securing a control body coaxially within the housing relative to a longitudinal axis of the valve, the control body and support structure therefor being streamlined so as not to interfere substantially with said flow of fluid along the flow paths, the housing and control body defining a coaxial flow passage communicating with the inlet and the outlet for flow of fluid from the inlet to the outlet, the flow passage directing the flow of fluid from the inlet to the outlet wherein the flow passage defines flow paths symmetrically extending about the control body, cross-sectional area of the flow passage cross sectional area defined by the housing being larger than cross-sectional area of the inlet at an upstream end of the control body and then incrementally reduced to a substantially constant value along the flow path in a direction over a portion of the control body toward a downstream rearward end of the control body, whereby fluid flowing in the flow passage is subjected to a wedge effect to maintain fluid in the flow passage in a focused flow stream as it flows around the control body, at least one valve member having a fitting end facing surface and a control body facing surface carried by the control body in an orientation for being shifted by driven movement along the axis relatively toward and away from the fitting end for control of fluid passing through the fitting end, an actuator within the control body for driving the valve member along the axis, means communicating with the actuator through said support structure for providing control power for the actuator, control means externally of the housing for selectively and controllably providing said control power to the actuator through the port for controllably driving the valve member to precisely control fluid flow through the valve.

9. A fluid control valve as set forth in claim 8 wherein the housing and an upstream end of the control body being relatively dimensioned such that the flow passage at the upstream end of the control body has an enlarged cross sectional area $kA_i$, transverse to the longitudinal axis, relating to an effective inlet cross sectional area $A_i$ also transverse to the longitudinal axis, wherein k is a constant which varies generally from about 1.1 to about 1.2 such that the cross sectional area $kA_i$ is substantially enlarged to said cross sectional area $kA_j$, and then is reduced therefrom as the path along the control body extends in a downstream direction around the control body, and then is maintained as a constant value a distance farther in a downstream direction along a portion of the control body.

10. A fluid control valve as set forth in claim 8 further comprising:
   a reaction element movable in response to the valve-carrying member and movable with the valve member,
   the reaction element extending upstream from the valve member and providing reaction surfaces within the flow passage transverse to the longitudinal axis,
   the reaction surfaces respectively facing upstream and downstream and each being of preselected cross-sectional area to be exposed to fluid within the flow passage for control and balance of forces for required for movement of the valve member in response to the actuator.

11. A precision co-axial control valve for in-line flow control of fluid, comprising:
   a housing including an inlet housing upstream portion having a fluid inlet at an upstream end and an outlet housing downstream portion having a fluid outlet at a downstream end, the housing defining a longitudinal axis of the valve extending from the inlet to the outlet,
   a control body supported within the housing coaxially relative to the longitudinal axis by support structure bridging between the control body and the housing,
   the support structure securing the control body in communication with the fluid such that the control body has an inlet facing surface, an outlet facing surface, and a peripheral surface radially outward from the control body radially surrounding the control body,
   the housing upstream and downstream portion, the support structure and control body together defining a flow passage communicating with the fluid inlet and outlet for flow of fluid through the valve from the inlet to the outlet wherein the flow passage defines flow paths in mutually symmetric relationship and extending around the control body,
   the support structure being streamline configured so as not to interfere substantially with said flow of fluid along the flow paths,
   the control body having upstream and downstream ends coaxial with the central axis, the upstream end being proximate the inlet and the downstream end being proximate the outlet,
   the housing and the upstream end of the control body extending to the downstream end define a flow passage cross sectional area $kA_i$ relating to an effective inlet cross sectional area $A_i$ and wherein k is a constant from about 1.1 to about 1.2,
   the fluid outlet defining a valve seat, the valve seat being concentric with the central axis,
   the control body having a support member extending along the central axis toward the downstream end to carry a valve member in an orientation for being shifted by driven movement along the central axis relatively toward and away from the valve seat for achieving control of fluid passing the valve seat,
   each housing half having a control body facing surface and a fitting end facing surface, operable to pass fluid selectively from the inlet to the outlet,
   the support structure disposed between the inlet housing half and the outlet housing half further having opposing raised lip regions extending from the inner peripheral surface toward each fitting end, deformably interfacing with corresponding recesses formed in an inner periphery of the control body facing surface of each housing half to effect a metal-to metal seal,
   a plurality of fastening devices outside the peripheral surface of the support structure to secure the support structure to the housing halves, the fastening devices tightened to a desired torque to allow flexure of the housing halves and the support structure to help dampen fluid flow surges,
   an actuator within the control body for driving the valve member along the central axis,
   at least one communication provided through the support structure for control communication with the actuator, and
   control means externally of the housing for selectively and controllably delivering a control source to the actuator by means of the communication for controllably driving the valve member to precisely control fluid flow through the valve.

12. A control valve as set forth in claim 11 wherein the control means is an electrical controlling apparatus includes means for sensing a pressure level within the valve, means for converting the pressure level to a pressure signal, means for comparing the pressure signal to a reference signal, and means for varying a control force provided by the actuator in response to a difference between the pressure signal and reference signal.

13. A control valve as set forth in claim 11 wherein the valve member is carried at a downstream end of the control body, the control valve further comprising:
   a pulsation dampener including a flow control member carried by the control body at an upstream end thereof,
   a second position controlling mechanism disposed between the control body and the flow control member and carried by the control body for urging the flow control member toward a position for opposing pulsations of fluid flow into the inlet.

14. A precision flow control valve comprising
   a valve body housing having upstream and downstream ends including a fluid inlet at an upstream end and a fluid outlet at a downstream end,
   a control body supported within the valve body housing by support structure bridging between the control body and the valve body housing,
   the valve body housing and control body together defining a flow passage communicating with the fluid inlet and outlet for flow of fluid through the valve from the inlet to the outlet in a direction of flow along fluid paths symmetric with respect to at least one axis of the control body, the control body and support structure being streamlined so as not to interfere substantially with said flow of fluid along the flow paths, the valve body housing and a leading end of the control body extending to a rearward end define a flow passage cross sectional area $kA_i$ relating to an effective inlet cross sectional area $A_i$ and wherein k is a constant from about 1.1 to about 1.2, the flow paths being symmetric about at least one axis perpendicular to the direction of fluid flow through the valve, at least one valve member having a downstream end facing surface and an upstream facing surface carried by the control body in an orientation downstream of the control body for being shifted by driven movement along said axis relatively toward and away from the exit outlet for control of fluid passing along said flow paths through the valve, a valve actuator located entirely within the control body for driving the valve member along said axis, at least one port extending through the support structure for communicating with the actuator and providing for control of the actuator.

15. A valve as set forth in claim 14 further comprising a valve support member operated by valve actuator and extending from the control body in a downstream direction therefrom for carrying the valve member for movement of same in relation to a valve seat downstream of the valve member.

16. A valve as set forth in claim 15 further comprising a control externally of the valve body housing communicating through the port for causing the valve member to be controllably driven by the valve actuator to position the valve member relative to the valve seat for selectively controlling the flow of fluid through the valve.

17. A valve as set forth in claim 16 wherein the upstream facing surface of the valve member defines a recess formed thereon to form an upstream boundary layer whereby to protect the surface of the valve member from wear from passage of fluid through the valve.

18. A valve as set forth in claim 15 wherein the control body has a downstream portion proximate the valve member defining a flow control member to help drive the valve member in a closing direction.

19. A valve as set forth in claim 15 further comprising a pulsation dampener including a flow control member carried by the control body at an upstream end thereof and means carried by the control body for urging the flow control member toward a position for opposing pulsations of fluid flow into the inlet.

20. A valve as set forth in claim 19 further comprising a valve member position detecting device carried within the valve for signalling the relative degree to which the valve is open.

21. A valve as set forth in claim 15 wherein the fluid control controllably provides externally supplied pressurized fluid to the actuator through said port for effecting controlled movement of the valve member by increasing or decreasing pressure communicated through the control port for respectively decreasing or increasing the fluid flow through the valve element by moving the valve element in respectively closing and opening directions.

22. A valve comprising as set forth in claim 15 wherein the downstream end of the valve body housing carries a valve seat for the valve member, the valve further comprising a seal supported in a recess formed in the valve member, the valve member having a conformal shoulder formed thereon between the seal and the end facing surface to effect a low friction interface between the seal of the valve member and the valve seat of the valve body housing.

23. A valve as set forth in claim 15 wherein the downstream end of the valve body housing carries a valve seat for the valve member, the valve member further comprising:

a valving element having a valve seat facing surface and a control body facing surface, a reaction element extending from the control body facing surface of the valving element forming a reaction surface against which fluid flowing along the flow path will react for urging valve member movement in a direction opposite fluid flow, a ratio of the reaction surface area of the valving element to the end facing surface area of the valving element being between about 2:1 and about 5:1.

24. A valve as set forth in claim 23 wherein a ratio of the reaction surface area of the valving element to the valve seat facing surface area of the valving element is between about 2:1 and about 4:1.

25. A valve as set forth in claim 23 wherein a ratio of the reaction surface area of the valving element to the valve seat facing surface area of the valving element is about 2:1.

26. A valve as set forth in claim 23 wherein the valving element and the reaction element of the valve member are of unitary construction.

27. A valve as set forth in claim 23 wherein the reaction element of the valve member is adapted for being connected interchangeably to valving elements defining differing flow profiles.

28. A precision co-axial control valve for in-line flow control, comprising a valve body housing having upstream and downstream ends including a fluid inlet at an upstream end and a fluid outlet at a downstream end, the valve body housing defining a central longitudinal axis extending between the upstream and downstream ends of the valve body housing, a control body supported within the valve body housing coaxial with the central longitudinal axis by a support structure bridging between the control body and the valve body housing, the valve body housing and control body together defining a flow passage communicating with the fluid inlet and outlet for flow of fluid through the valve from the inlet to the outlet wherein the flow passage defines flow paths in mutually symmetric relationship extending around the control body, the support structure being configured so as not to interfere substantially with said flow of fluid along the flow paths, the control body having upstream and downstream ends coaxial with the central longitudinal axis, the upstream end of the control body being proximate the inlet and the downstream end being proximate the outlet, a valve seat proximate one end of the control body, the valve seat being concentric with the central longitudinal axis, at least one valve member carried by the control body in an orientation for being shifted by driven movement along the central longitudinal axis relatively toward and away from the valve seat for varying the flow of fluid passing the valve seat, an actuator within the control body for driving the valve member along the central longitudinal axis, at least one port extending through the support structure for control fluid communication with the actuator, and a fluid control externally of the valve body housing for controllably providing control fluid to the actuator through the port under pressure from the fluid control to cause the valve member to be controllably driven to position the valve member for precisely controlling the flow of fluid through the valve.

29. A valve as set forth in claim 28 where the valve has an outer facing surface and a control body-facing surface, the outer facing surface of the valving element forming a reaction surface against which fluid flowing about the control body in the flow passage will react for urging the valve member in a direction opposite to the direction of fluid flow in the flow passage, a ratio of the reaction surface area to a surface area of control body-facing surface being between about 2:1 and about 5:1.

* * * * *